United States Patent
Ho

(10) Patent No.: US 9,934,224 B2
(45) Date of Patent: Apr. 3, 2018

(54) DOCUMENT EDITOR WITH RESEARCH CITATION INSERTION TOOL

(71) Applicant: Google LLC, Mountain View, CA (US)

(72) Inventor: Ronald Ho, Fremont, CA (US)

(73) Assignee: GOOGLE LLC, Mountain View, CA (US)

( * ) Notice: Subject to any disclaimer, the term of this patent is extended or adjusted under 35 U.S.C. 154(b) by 910 days.

(21) Appl. No.: 13/776,599

(22) Filed: Feb. 25, 2013

(65) Prior Publication Data

US 2015/0193408 A1    Jul. 9, 2015

Related U.S. Application Data

(60) Provisional application No. 61/647,453, filed on May 15, 2012.

(51) Int. Cl.
*G06F 17/30* (2006.01)
*G06F 17/22* (2006.01)
*G06F 17/27* (2006.01)

(52) U.S. Cl.
CPC .... *G06F 17/30038* (2013.01); *G06F 17/2235* (2013.01); *G06F 17/2765* (2013.01); *G06F 17/30867* (2013.01)

(58) Field of Classification Search
CPC ............. G06F 17/2235; G06F 17/2765; G06F 17/30876; G06F 17/30722; G06F 17/30728; G06F 17/30014; G06F 17/30038
USPC ......................................... 715/255, 208, 277
See application file for complete search history.

(56) References Cited

U.S. PATENT DOCUMENTS

| | | | |
|---|---|---|---|
| 6,990,452 B1* | 1/2006 | Ostermann | G10L 13/00 345/473 |
| 8,479,094 B2* | 7/2013 | Fouts | G06F 17/21 707/770 |
| 2006/0004717 A1* | 1/2006 | Ramarathnam | G06F 17/30864 |
| 2007/0174338 A1* | 7/2007 | Liggett | G06F 17/30864 |
| 2008/0091430 A1* | 4/2008 | Bellegarda | G10L 13/033 704/258 |
| 2010/0082570 A1* | 4/2010 | Altaf | G06F 17/30637 707/706 |
| 2011/0060761 A1* | 3/2011 | Fouts | G06F 17/21 707/770 |
| 2012/0036125 A1* | 2/2012 | Al-Kofahi | G06F 17/30637 707/728 |

(Continued)

*Primary Examiner* — Scott T Baderman
*Assistant Examiner* — Seung W Jung
(74) *Attorney, Agent, or Firm* — Morgan, Lewis & Bockius LLP

(57) ABSTRACT

A method performed at a server system having one or more processors and memory storing one or more programs executed by the one or more processors is described. The method includes receiving from a respective client system a subset of a document displayed at the respective client system. The method also includes identifying one or more words in the received subset of the document, and sending to the respective client system one or more information items corresponding to the one or more words. The method includes receiving a selection of an information item in the one or more information items. The selection is made by a user associated with the respective client system. The method furthermore includes modifying the document by inserting a citation to the selected information item.

20 Claims, 18 Drawing Sheets

(56) References Cited

U.S. PATENT DOCUMENTS

2013/0031088 A1\* 1/2013 Srikrishna ......... G06F 17/30864
707/722

\* cited by examiner

DOCUMENT EDITOR WITH RESEARCH CITATION INSERTION TOOL

RELATED APPLICATION

This application claims priority to U.S. Provisional Patent Application Ser. No. 61/647,453, entitled "Document Editor with Research Citation Insertion Tool," filed May 15, 2012, which is incorporated by reference herein in its entirety.

BACKGROUND

The disclosed embodiments relate generally to electronic document editors. More particularly, the disclosed embodiments relate to methods and systems for electronic document editors that are configured to insert citations to information items.

Academic papers (or scholarly papers) play an important role in sharing ideas and reporting new findings. An academic paper (e.g., journal articles) typically includes dozens, if not hundreds, of citations. Thus, finding relevant references and inserting citations in a proper format require significant amount of time.

Recently, the use of electronic document editors has increased significantly. Electronic document editors (e.g., a word processor) typically allow editing, viewing, and printing of electronic documents. However, traditional electronic document editors are not effective in managing citations. Thus, there is a need for a new method and system for managing citations in an electronic document editor.

SUMMARY

A number of embodiments (e.g., of server systems, client systems or devices, and methods of operating such systems or devices) are presented below. These embodiments provide methods, systems, and graphical user interfaces (GUIs) for inserting a selected citation to a displayed document.

As described in more detail below, some embodiments involve a computer-implemented method performed at a server system having one or more processors and memory storing one or more programs executed by the one or more processors. The method includes receiving from a respective client system a subset of a document displayed at the respective client system. The method also includes identifying one or more words in the received subset of the document, and sending to the respective client system one or more information items corresponding to the one or more words. The method furthermore includes receiving a selection of an information item in the one or more information items. The selection is made by a user associated with the respective client system. The method includes modifying the document by inserting a citation to the selected information item.

In accordance with some embodiments, a computer implemented method is performed at a server system having one or more processors and memory storing one or more programs executed by the one or more processors. The method includes receiving from a respective client system a subset of a document displayed at the respective client system. The method also includes identifying one or more words in the received subset of the document, and sending to the respective client system one or more information items corresponding to the one or more words. The method furthermore includes sending to the respective client system instructions for receiving a selection of an information item in the one or more information items. The selection is made by a user associated with the respective client system. The instructions also include instructions for modifying the displayed document by inserting a citation to the selected information item.

In accordance with some embodiments, a computer implemented method is performed at a client system having one or more processors and memory storing one or more programs executed by the one or more processors. The method includes identifying one or more words in a first document displayed at the client system, and initiating a search to identify one or more documents. Each identified document includes a respective focus region corresponding to at least some of the one or more words. The method also includes displaying document information corresponding to a subset of the identified documents, and detecting a selection of a second document in the subset of the identified documents. The method furthermore includes modifying the first document by inserting the respective focus region of the second document.

In accordance with some embodiments, a computer implemented method is performed at a server system having one or more processors and memory storing one or more programs executed by the one or more processors. The method includes synchronizing content of a first document displayed at a respective client system with a copy of the first document stored at the server system. The method also includes sending to the respective client system a set of instructions for identifying one or more words in the first document displayed at the respective client system, and initiating a search to identify one or more documents. Each identified document includes a respective focus region corresponding to at least some of the one or more words. The set of instructions also includes instructions for displaying document information corresponding to a subset of the identified documents, detecting a user selection of a second document in the subset of the identified documents, and modifying the first document by inserting the respective focus region of the second document. The method furthermore includes synchronizing content of the first document, as modified by the client system by execution of the instructions for modifying the first document, with the copy of the first document stored at the server system.

In accordance with some embodiments, a computer implemented method is performed at a server system having one or more processors and memory storing one or more programs executed by the one or more processors. The method includes sending to a respective client system a copy of the first document stored at the server system and a set of instructions for identifying one or more words in the first document displayed at the respective client system, and initiating a search to identify one or more documents. Each identified document includes a respective focus region corresponding to at least some of the one or more words. The set of instructions also includes instructions for displaying document information corresponding to a subset of the identified documents, and detecting a user selection of a second document in the subset of the identified documents. The method also includes modifying the first document by inserting the respective focus region of the second document. The method furthermore includes sending to the respective client system at least a subset of the modified first document.

In accordance with some embodiments, a system includes one or more processors and memory storing one or more programs for execution by the one or more processors. The one or more programs include instructions for performing any of the aforementioned methods.

In accordance with some embodiments, a non-transitory computer readable storage medium stores one or more programs for execution by one or more processors in a computer system. The one or more programs include instructions for performing any of the aforementioned methods.

BRIEF DESCRIPTION OF THE DRAWINGS

For a better understanding of aforementioned embodiments, reference should be made to the Description of Embodiments below, in conjunction with the following drawings in which like reference numerals refer to corresponding parts throughout the figures.

Like reference numerals refer to corresponding parts throughout the drawings.

DESCRIPTION OF EMBODIMENTS

Figure 1:
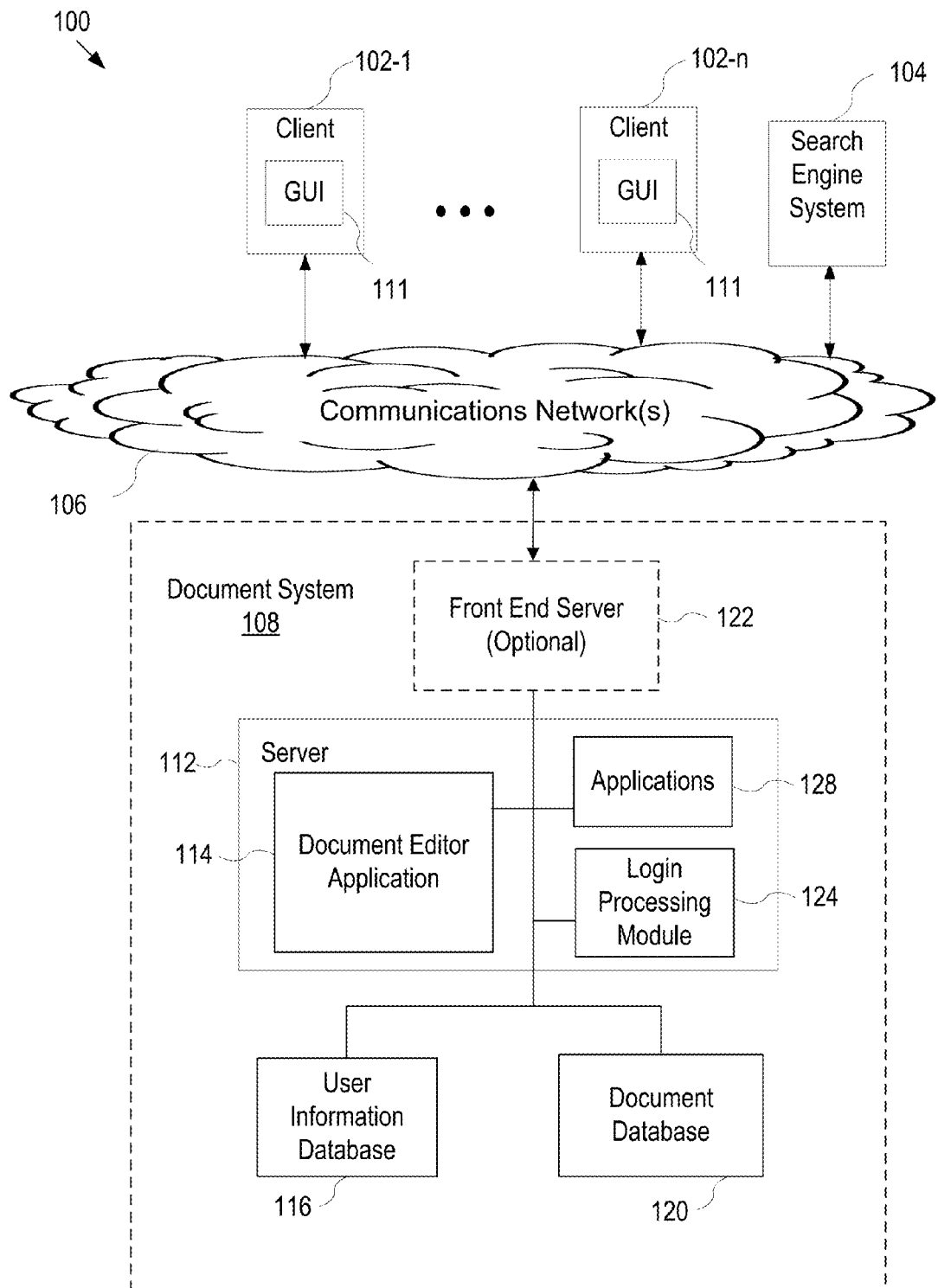
FIG. 1 is a block diagram illustrating an example of a distributed computer system, in accordance with some embodiments.

Methods and systems for inserting a citation to a selected information item are described. Reference will be made to certain embodiments, which are illustrated in the accompanying drawings. While the described in conjunction with the embodiments, the claims are intended to cover alternatives, modifications and equivalents of the described embodiments.

Moreover, in the following description, numerous specific details are set forth to provide a thorough understanding of the embodiments. However, it will be apparent to one of ordinary skill in the art that various embodiments may be practiced without these particular details. In other instances, methods, procedures, components, and networks that are well-known to those of ordinary skill in the art are not described in detail to avoid obscuring other aspects of the described embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact. The first contact and the second contact are both contacts, but they are not the same contact.

The terminology used in the description of the embodiments herein is for the purpose of describing particular embodiments only and is not intended to be limiting of the claims. As used in the description of embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting" that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining," "in response to determining," "in accordance with a determination," "upon detecting," or "in response to detecting" that the stated condition precedent is true, depending on the context.

As used herein, the term "URL" refers to a uniform resource locator, which is used interchangeably with a uniform resource identifier (URI).

FIG. 1 is a block diagram illustrating an example of distributed computer system 100, according to certain embodiments. In FIG. 1, system 100 includes one or more client computers 102, communications network 106, document system 108, and (optional) one or more search engine systems 104. Various embodiments of document system 108 implement the methods described in this document.

Client computers 102 can be any of a number of computing devices (e.g., Internet kiosk, personal digital assistant, cell phone, gaming device, desktop computer, laptop computer, tablet computer, handheld computer, or combinations thereof) used to enable the activities described below. Client computer(s) 102 is also referred to herein as client(s), client device(s) or client system(s). Client 102 typically includes a graphical user interface (GUI) 111. Client 102 is described in greater detail below with reference to FIG. 3. Client 102 is connected to document system 108 via communications network 106. As described in more detail below, GUI 111 of client 102 is used to display one or more documents and information items. Document system 108 provides document services (e.g., document authoring, editing, sharing, mailing, and/or viewing services) to a community of users (e.g., the employees of a company, the members of an organization or group, friends, family members, etc.) who access document system 108 from clients 102.

Document system 108 includes one or more servers, such as server 112, connected to communications network 106. Optionally, the one or more servers are connected to communications network 106 via front end server 122. In some embodiments, front end server 112 conveys (and optionally parses) inbound requests to the appropriate server of document system 108, and formats responses and/or other information being sent to clients in response to requests. Front end server 122, if present, may be a web server providing web based access to document system 108. Front end server 122, if present, may also route communications to and from other destinations, such as a remote document server or a remote search engine system 104.

In some embodiments, document system 108 includes user information database 116, and document database 120. In some embodiments, document system 108 also includes or has access to one or more other databases, such as a login database (not shown), which maintains login information. In some embodiments, server 112 includes document editor application 114, login processing module 124, and applications 128. Server 112 communicates with databases internal to document system 108, such as user information database 116 and document database 120 using a local area network, by internal communication busses, or by any other appropriate mechanism or combination of mechanism.

Server 112 is also referred to herein as a server system. Server 112 communicates with clients 102 via front end server 122 (if present) and communications network(s) 106. In some embodiments, communications network 106 is the Internet. In other embodiments, communications network 106 can be any local area network (LAN), wide area network (WAN), metropolitan area network, or a combination of such networks. In some embodiments, server 112 is a web server that manages document editing requests using appropriate communication protocols. Alternatively, if server 112 is used within an intranet, server 112 may be called an intranet server.

Applications 128 include application programs used for managing an online document system. In some embodiments, applications 128 also include a user information processing module (not shown), where the user information processing module assists in accessing and updating user information database 116. User information database 116 stores information associated with the users of document system 108, for example user preferences, and/or display styles. In some implementations, user information database 116 also includes login information (e.g., user names, passwords, other authentication information, etc.). Document database 120 stores information concerning various types of documents as well as data (e.g., document contents and/or document files).

Document editor application 114 provides document editing services. In some embodiments, document editor application 114 retrieves document information from document database 120, and sends at least a subset of the document information to a respective client 102. Document editor application 114 typically receives document editing requests from respective client 102, and modifies the document information in accordance with the document editing requests. Alternatively, document editor application 114 provides a set of instructions such that respective client 102 modifies the document information. Document editor application 114 also sends information items that can be used in editing the document information. In some embodiments, document editor application 114 assists in accessing and updating document database 120, and in some embodiments, user information database 116. In other embodiments, login processing module 124 assists in accessing and updating user information database 116 when user information database 116 includes login information.

In some embodiments, document database 120 stores supplemental information (e.g., metadata) concerning various documents in the document database. A non-exhaustive set of examples of such information includes document identifier (document ID), author, access control list, document size, timestamps (e.g., timestamps for one or more of creation date, revision history, last updated time, last accessed time, etc.), and document type (e.g., word processor document, spreadsheet, presentation file, etc.). In some embodiments, document database 120 also stores document data (e.g., contents) or information about a location of document data (e.g., a pointer to a remote server or a document file stored at the remote server). Optionally, document database 120 stores bibliographic information or other citation information for documents that have been published, documents that are publicly accessible, and/or documents that are accessible and citable by one or more predefined groups of users.

In some embodiments, user information database 116 includes user information records having information relevant to the display of document information. For example, the user information record for a respective user may include, in addition to identifying information for the user, document folders, and default display settings (e.g., display of a particular document, content of a particular folder, a list of documents associated with a particular document processing application (such as a word processor application, a spreadsheet application, or a presentation application), or a list of documents that the user has accessed, or created, or that are otherwise associated with the user.

In essence, server 112 is configured to manage certain aspects of document system 108, including document editing requests from a respective client 102.

Optionally, document system 108 is implemented as part of a document sharing system that provides document services (e.g., document authoring, editing, sharing, mailing, and/or viewing services) to a community of users (e.g., employees of a company, students of a school, members of an organization or group, etc.).

In some embodiments, fewer and/or additional modules, functions or databases are included in document system 108 and server 112. The modules shown in document system 108 and server 112 represent functions performed in certain embodiments.

In some embodiments, client 102 and/or document system 108 is connected to one or more search engine systems 104 via communications network 106. A respective search engine system 104 receives key words, and provides a list of search results that match the key words. Search results typically include web search results. The search results can also include news search results, book search results, and academic publication search results.

Figure 2:
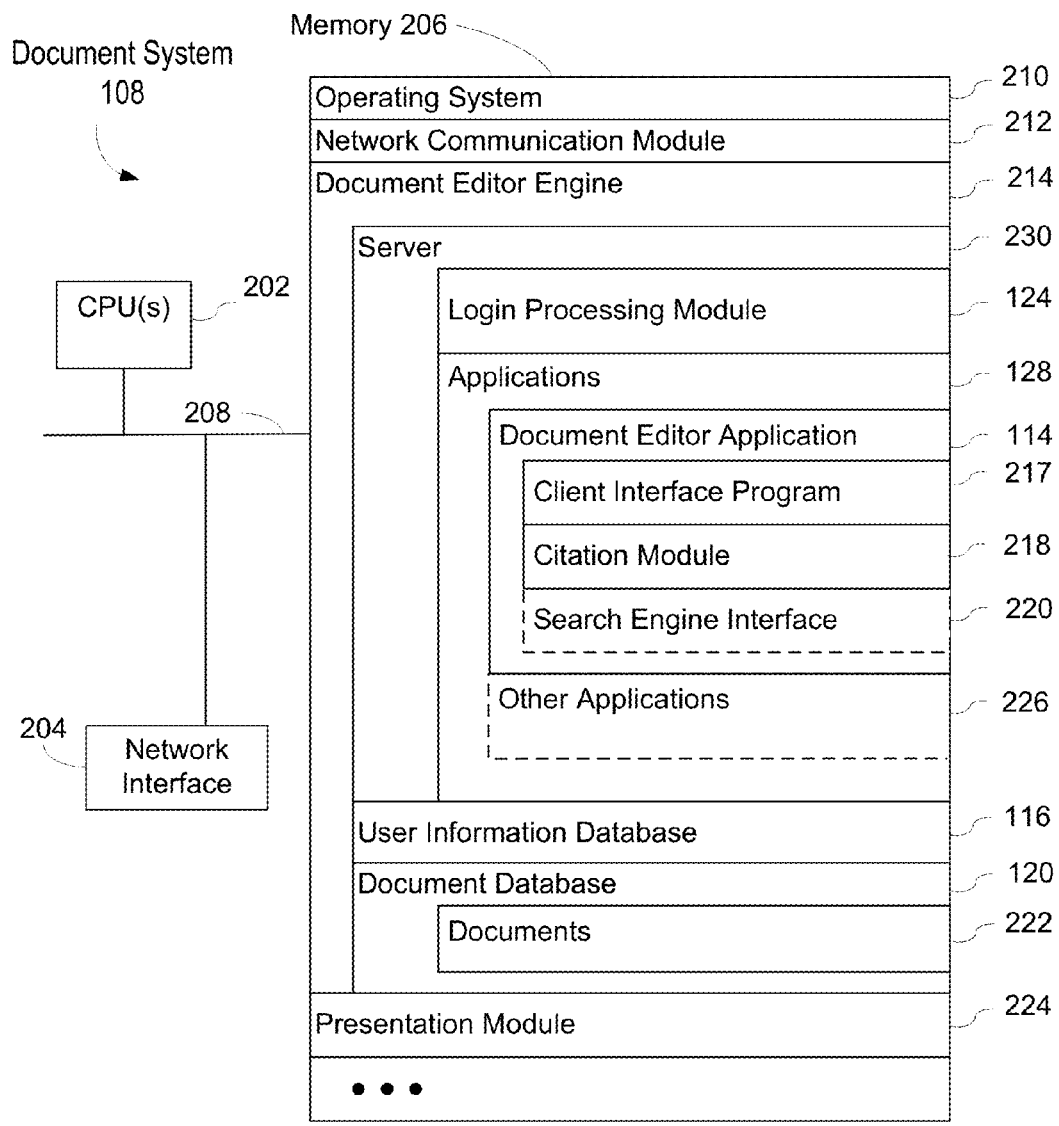
FIG. 2 is a block diagram illustrating a document system, in accordance with some embodiments.

FIG. 2 is a block diagram illustrating document system 108 in accordance with some embodiments. Document system 108 typically includes one or more processing units (CPUs) 202, one or more network or other communications interfaces 204, memory 206, and one or more communication buses 208 for interconnecting these components. In some embodiments, communication buses 208 include circuitry (sometimes called a chipset) that interconnects and controls communications between system components. In some embodiments, document system 108 includes a user interface (not shown) (e.g., a user interface having a display device, a keyboard, and a mouse or other pointing device), but more typically document system 108 is controlled from and accessed by various client systems.

Memory 206 of document system 108 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 206 may optionally include one or more storage devices remotely located from CPU(s) 202. Memory 206, or alternately the non-volatile memory device(s) within memory 206, comprises a computer readable storage medium. The computer readable storage medium of memory 206 is a non-transitory computer readable medium for storing information. In some embodiments, memory 206 or the computer readable storage medium of memory 206 stores the following programs, modules and data structures, or a subset thereof:

- operating system 210 that includes procedures for handling various basic system services and for performing hardware dependent tasks;
- network communication module (or instructions) 212 that is used for connecting document system 108 to other computers (e.g., clients 102) via one or more communications interfaces 204 and one or more communications networks 106 (FIG. 1), such as the Internet, other wide area networks, local area networks, metropolitan area networks, and so on;
- document editor engine 214 that receives document editing requests from and provides responses to clients 102; and
- presentation module 224 that formats results from document editor engine 214 for display at respective clients; for example, presentation module 224 may generate a web page or XML document that includes document information; in some embodiments presentation module 224 is executed by front end server 122, which comprises one of the servers implementing document system 108; optionally presentation module 224 is a module of document editor engine 214.

In some embodiments, document editor engine 214 includes the following programs, modules and data structures, or a subset or superset thereof:

- one or more server modules 230, corresponding to server 112 in FIG. 1, for managing certain aspects of the document system 108 including login processing module 124, and applications 128, including document editor application 114 for performing the primary functions of an online document system; applications 128 may optionally include other applications 226;
- user information database 116 that stores records for users; and
- document database 120 that stores documents 222 (e.g., document contents and/or document files), and possibly other document data as well (e.g., author, access control list, time stamps, document size, document type, etc.).

In some embodiments, document editor application 114 includes a client interface program (or module) 217 for receiving document information requests from clients 102 and generating responses to the requests, and citation module 218 for identifying information items and providing the information items to client 102. Document editor application 114 may optionally include search engine interface 220 for obtaining information items from one or more search engines 104 (FIG. 1).

Each of the above identified modules and applications corresponds to a set of instructions for performing one or more functions described above. These modules (i.e., sets of instructions) need not be implemented as separate software programs, procedures or modules, and thus various subsets of these modules may be combined or otherwise re-arranged in various embodiments. In some embodiments, memory 206 may store a subset of the modules and data structures identified above. Furthermore, memory 206 may store additional modules and data structures not described above.

Notwithstanding the discrete blocks in FIGS. 1 and 2, these figures are intended to be a functional description of some embodiments rather than a structural description of functional elements in the embodiments. One of ordinary skill in the art will recognize that an actual implementation might have the functional elements grouped or split among various components. In practice, and as recognized by those of ordinary skill in the art, items shown separately could be combined and some items could be separated. For example, in some embodiments, one or more databases described herein, such as user information database 116, are part of or stored within server 112. In other embodiments, one or more databases described herein, such as user information database 116, are implemented using one or more servers whose primary function is to store and process user information. In some embodiments, document database 120 includes user database 116, or vice versa. In some embodiments, document database 120 is implemented on one or more remote servers.

The number of servers used to implement document system 108 and how features are allocated among them will vary from one implementation to another, and may depend in part on the amount of data stored by document system 108, and may also depend on the amount of data traffic that document system 108 must handle during peak usage periods as well as during average usage periods. Moreover, one or more of the blocks (e.g., server 112, document database 120, etc.) in FIG. 1 may be implemented on one or more servers designed to provide the described functionality. Although the description herein refers to certain features implemented in client 102 and certain features implemented in server 112, the embodiments are not limited to such distinctions. For example, features described herein as being part of server 112 can be implemented in whole or in part in client 102, and vice versa.

Figure 3:
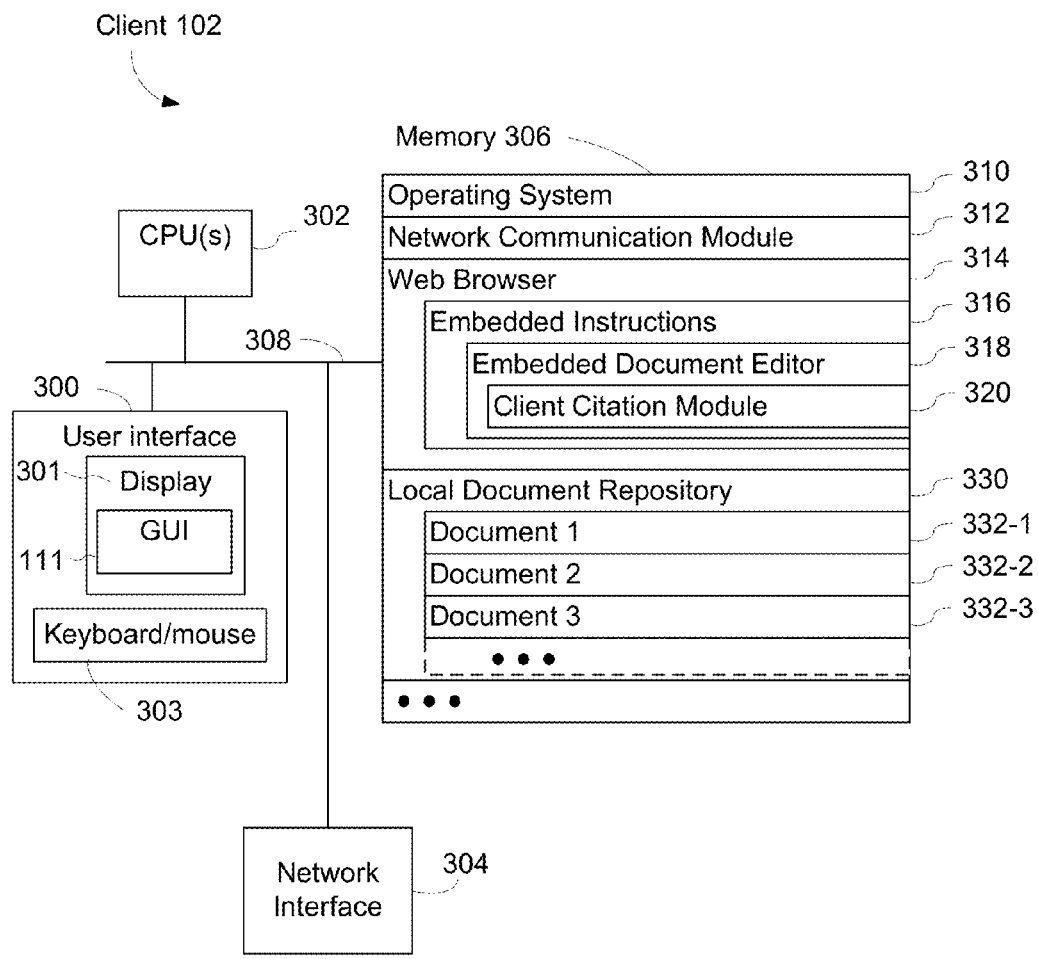
FIG. 3 is a block diagram illustrating a client, in accordance with some embodiments.

FIG. 3 is a block diagram illustrating client 102, also called a client system or a client device, in accordance with some embodiments. Client 102 is configured for use by a subscriber (also herein called "the user") of document system 108. Client 102 includes user interface 300, which typically includes display device 301, and one or more input devices 303 such as a keyboard and a mouse or other pointing device. As noted above, client 102 includes graphical user interface (GUI) 111, which is displayed on display device 301. Client 102 typically includes one or more processing units (CPUs) 302, one or more network or other network communications interfaces 304, memory 306, and one or more communication buses 308 for interconnecting these components. Communication buses 308 may include circuitry (sometimes called a chipset) that interconnects and controls communications between system components.

Memory 306 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 306 may optionally include one or more storage devices remotely located from the CPU(s) 302. Memory 306, or alternately the non-volatile memory device(s) within memory 306, comprises a non-transitory computer readable medium. In some embodiments, memory 306 or the computer readable storage medium of memory 306 stores the following programs, modules and data structures, or a subset thereof:

operating system 310 that includes procedures for handling various basic system services and for performing hardware dependent tasks;

network communication module (or instructions) 312 that is used for connecting client 102 to other computers (e.g., document system 108 and other clients 102) via one or more communications network interfaces 304 and one or more communication networks 106 (FIG. 1), such as the Internet, other wide area networks, local area networks, metropolitan area networks, and so on;

web browser application 314, which processes and initiates display of a web document (e.g., 332-1 through 332-3) in GUI 111; and (optional) local document repository 330, which includes a plurality of documents (e.g., document 1 (332-1), document 2 (332-2), document 3 (332-3), etc.); a respective document is typically a webpage (or XML document or the like) received from document system 108; in some embodiments, the local document repository also includes documents of other document types (e.g., proprietary document formats used by word processor applications, spreadsheet applications, presentation applications, etc.).

In some embodiments, web browser application 314 or an extension, plug-in or toolbar of the web browser application includes embedded instructions 316 including embedded document editor 318. In some embodiments, embedded document editor 318 is included in a web page (e.g., document 332-1) received from the document system 108. Embedded document editor 318 modifies documents and handles data formatting and/or management tasks, at least some of which would otherwise be handled by presentation module 224 (FIG. 2).

Respective document 332 stored in the local document repository 330 includes document information for display in the GUI 111. In some embodiments, respective document 332 includes embedded instructions (e.g., embedded document editor 318) for receiving document-related input from a computer user (e.g., a request to edit a displayed document or to display a different document) and for formatting document information for display in GUI 111. Alternatively, or additionally, the instructions for receiving document-related input from the computer user and/or for formatting document information for display may be implemented in web browser 314, as mentioned above, or as a stand-alone application in memory 306.

Optionally, memory 306 includes other applications or components.

FIGS. 4A-4E illustrate examples of user interfaces, in accordance with some embodiments.

Figure 4A:
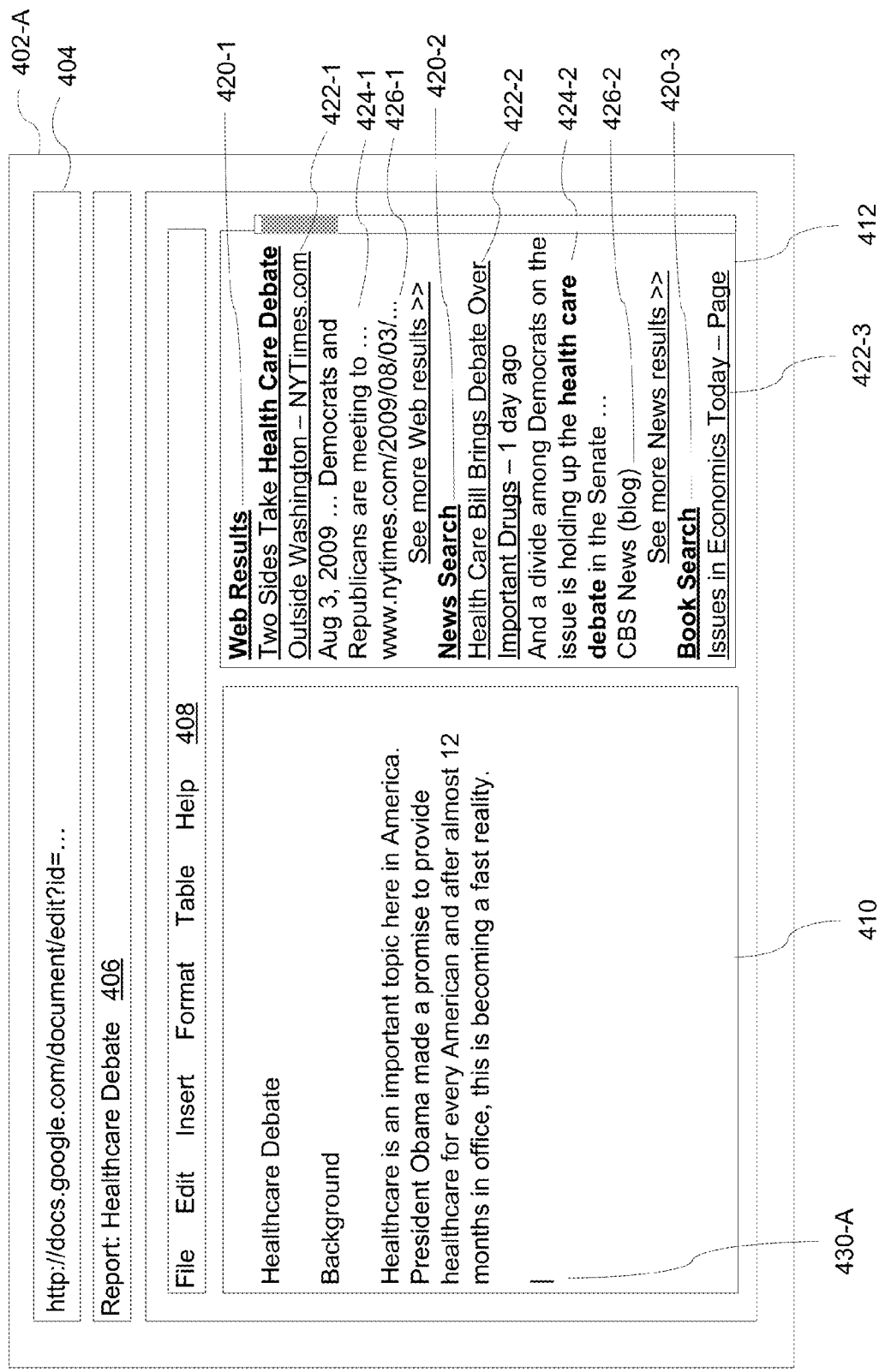
FIGS. 4A-4E illustrate examples of user interfaces, in accordance with some embodiments.

FIG. 4A illustrates an example of user interface 402-A displayed in GUI 111 of client 102. User interface 402-A includes display of a web page that corresponds to URL 404. As illustrated, user interface 402-A includes:

subject 406 that includes a subject of the displayed document;

document editor menu 408;

document view 410 that includes at least a portion of a document (or a subset of document content); and information item view 412 that typically includes a plurality of information items.

Document view 410 is typically used to receive and display user inputs. For example, cursor 430-A is displayed in document view 410, and when the user types characters on keyboard 303 (FIG. 3), the typed characters are inserted to a location in the displayed document corresponding to a location of the cursor. In addition, the typed characters are displayed at a location that corresponds to a location of cursor 430-A. As illustrated, document view 410 includes text provided by a user.

Information item view 412 includes a plurality of information items. The plurality of information items are typically grouped into categories. As illustrated, information item view 412 includes Web Results 420-1, News Search 420-2, and Book Search 420-3 categories. A respective category generally includes one or more information items. However, in some cases, some categories may not include any information item (when there is no matching information item in that category). Typically, category heading 420 for a category that does not include any information item is not displayed. In some embodiments, respective category heading 420 is a user interface object that when activated initiates displaying additional information items in a corresponding category. For example, in some embodiments, when a user activates Web Results 420-1 (e.g., positioning a mouse cursor on Web Results 420-1 and clicking on it), information item view 412 displays additional information items in the web results category. In some embodiments, activating the "See more Web results" user interface object generates the same result. Alternatively, activating Web Results 420-1 may open a new web page (in a new window or a new tab of the current window) with additional web results.

In some embodiments, a respective information item in information item view 412 includes subject/title 422, focus region 424, and source 426. Subject/title 422 is typically a subject or title specified in a corresponding document. For example, when the information item corresponds to a web page, subject/title 422 is typically a title of the corresponding web page. In some embodiments, subject/title 422 is determined in accordance with the content of the document (e.g., the first sentence of the document or the most frequently used phrases, etc.).

In some embodiments, focus region 424 is a region in the corresponding document that includes some key words identified from the displayed document. As illustrated, the displayed document includes the phrase "healthcare debate" in multiple locations, and a respective information item corresponds to a respective document that includes the phrase "healthcare debate." The portion of the respective document that includes the phrase "healthcare debate" is displayed as a focus region. When the respective document includes the identified key words (or key phrase(s)) in multiple regions, one of the multiple regions is selected as a representative focus region. In some embodiments, a region that best matches the identified key words is selected (e.g., the selected region includes the key words exactly, or the identified key words appear in the selected region with the least number of words among the identified key words). For example, in the respective document, a first paragraph, a title, or a last paragraph that includes the key words is selected. Alternatively, focus region 424 is a representative region of the corresponding document, often pre-selected by the author or the publisher of the corresponding document.

In some embodiments, source 426 indicates where the corresponding document is located. For example, source 426 may include a URL of the corresponding document (e.g., "www.nytimes.com/2009/08/03/ . . . "), or the name of the source of the corresponding document (e.g., "CBS News (blog)"). In some embodiments, activating source 426 initiates displaying a corresponding document (in a new window or a new tab of the current window).

In some embodiments, activating a respective source (e.g., 426-1) initiates inserting a citation to a corresponding information item (e.g., 422-1). In addition or instead, activating a respective focus region (e.g., 424-1) initiates inserting the citation to the corresponding information item (e.g., 422-1). Optionally, activating a title (e.g., 422-1) also initiates inserting the citation to the corresponding information item (e.g., 422-1).

Figure 4B:
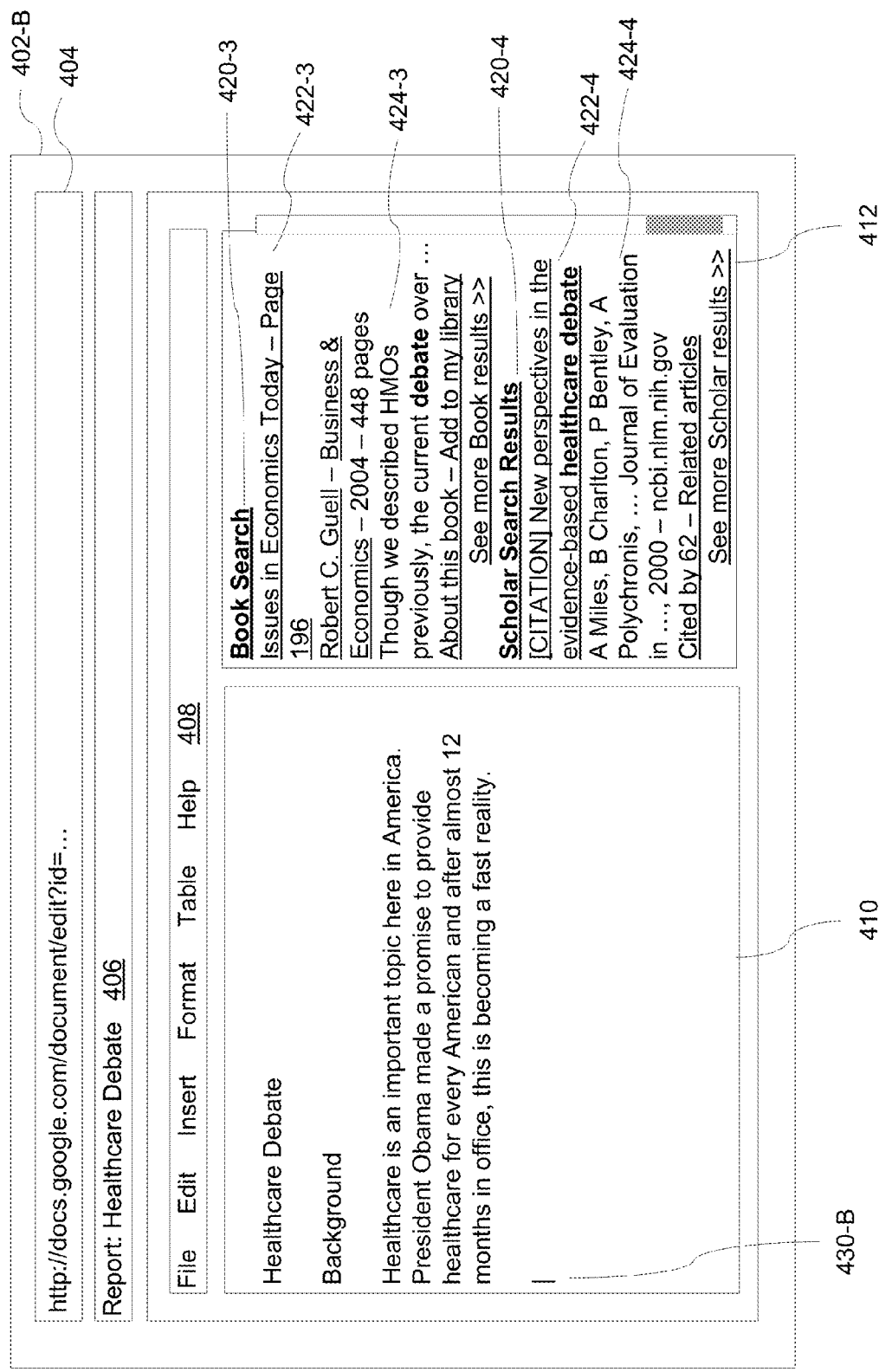

In some embodiments, information item view 412 is scrollable. FIG. 4B illustrates an example of user interface 402-B after scrolling information item view 412. After scrolling, information item view 412 displays an additional category, Scholar Search Results 420-4, and an information item with title 422-4, focus region 424-4, and additional information (e.g., a number of times a corresponding article has been cited, such as "Cited by 62") about this information item.

Figure 4C:
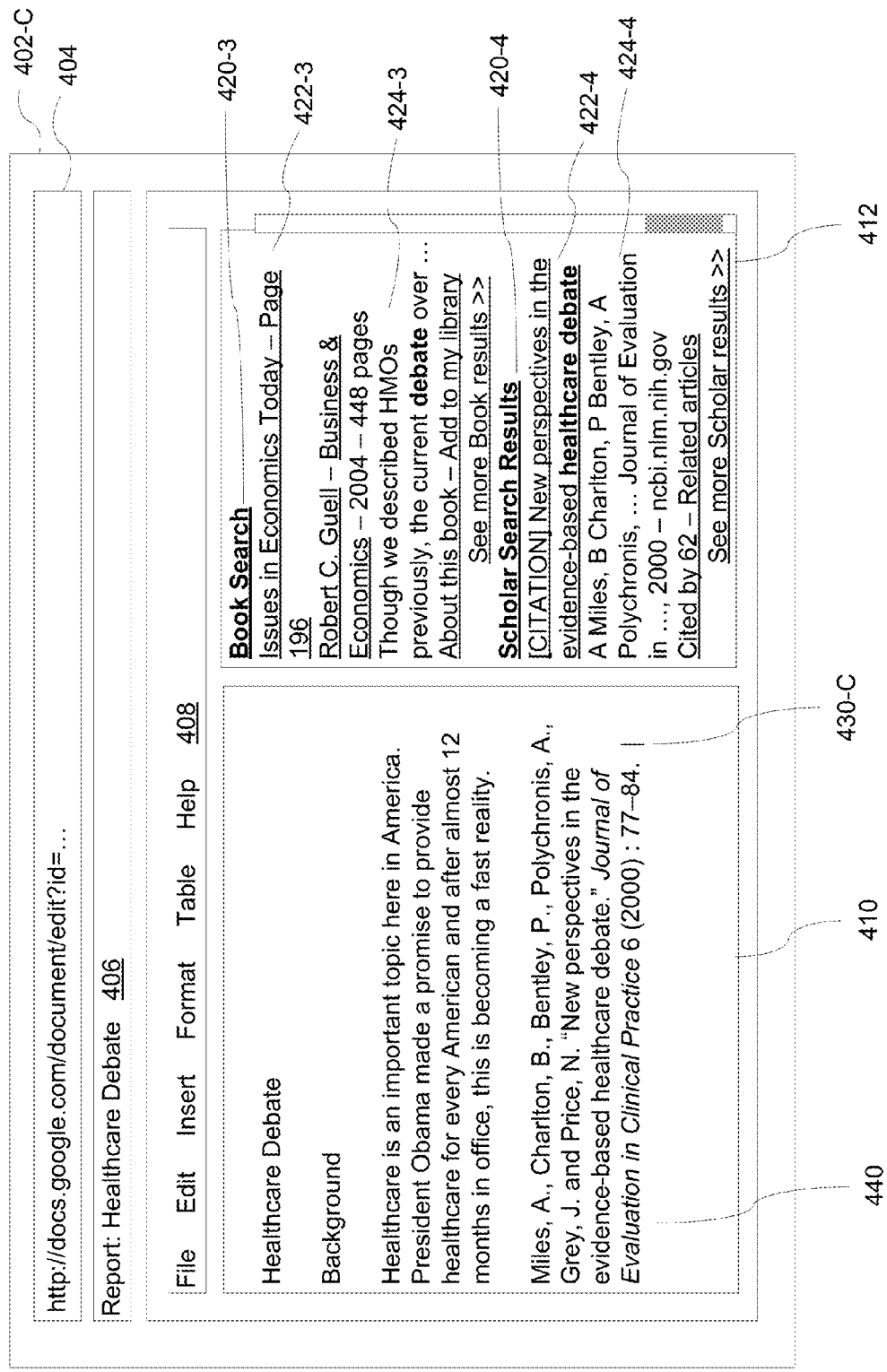

FIG. 4C illustrates an example of user interface 402-C after selection of an information item (e.g., by activating the title, focus region, or source of the information item). In response to the selection of the information item, citation 440 to the selected information item is inserted into the document displayed in document view 410 at a previous location of cursor 430-B (FIG. 4B). After citation 440 is inserted, the cursor moves to new location 430-C.

Figure 4D:
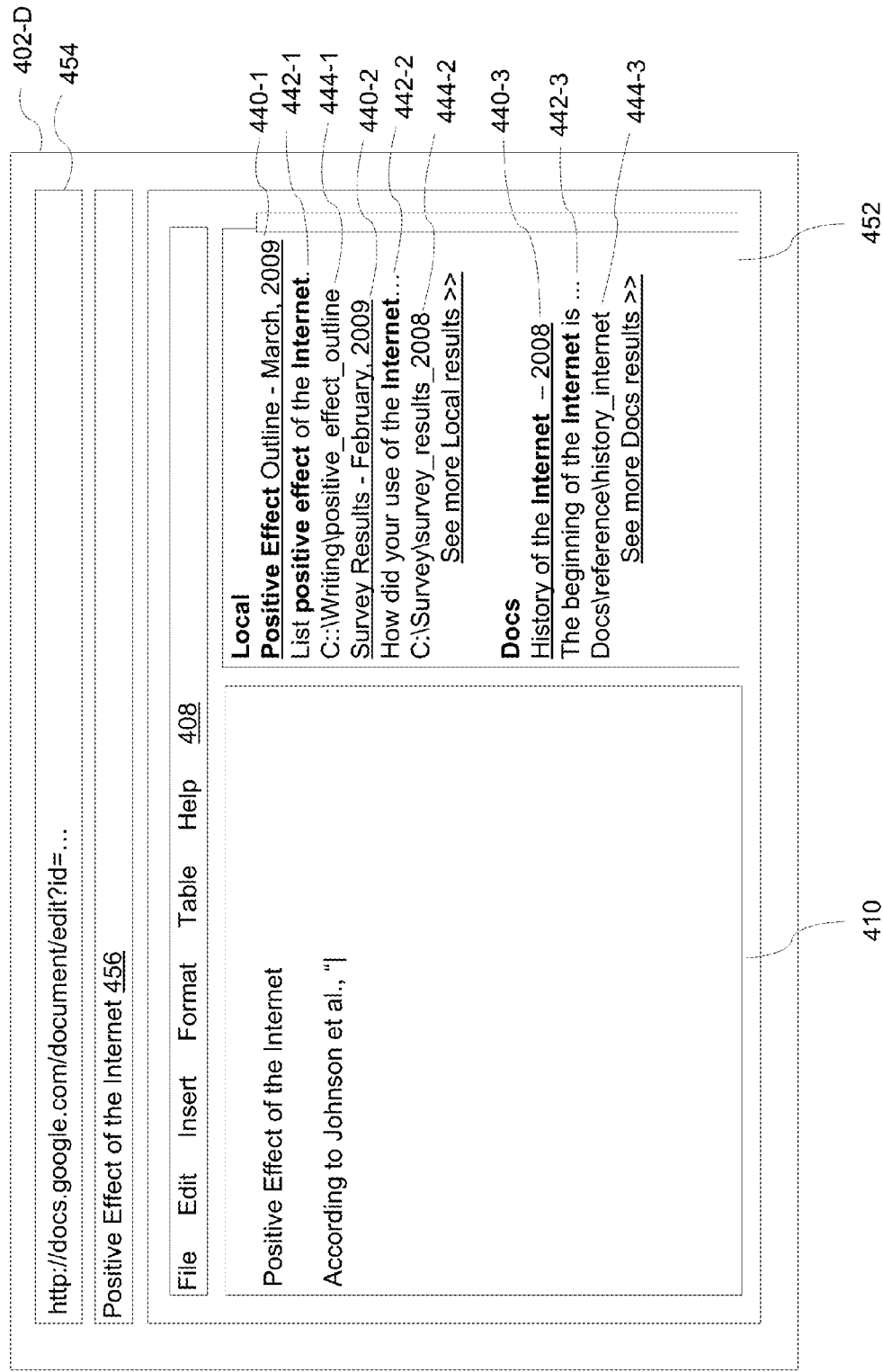

FIG. 4D illustrates an example of user interface 402-D in accordance with some embodiments. User interface 402-D in FIG. 4D includes a web page that corresponds to URL 454. The web page includes the following, or a subset or superset thereof:

subject 456 that includes a subject of the displayed document;
document editor menu 408;
document view 410 that includes at least a subset of a document; and
document information view 452 that includes information associated with a plurality of identified documents.

Document information view 452 includes information associated with a plurality of identified documents. The plurality of identified documents is identified in accordance with one or more words in a document displayed in document view 410. The plurality of identified documents is typically grouped into categories. As illustrated, document information view 452 includes local documents ("Local") and online documents ("Docs") categories. A respective category generally includes information associated with one or more documents. However, in some cases, some categories may not include document information corresponding to any document (when there is no matching document in that category). In some embodiments, a respective category is a user interface object that when activated initiates displaying information corresponding to additional documents in the respective category. For example, in some embodiments, when a user activates the "Local" text (e.g., by positioning a mouse cursor on the "Local" text and clicking on it), the document information view 452 displays additional documents in the local documents category. In some embodiments, activating the "See more Local results" user interface object generates the same result. Alternatively, activating the "Local" text may open a new web page (in a new window or a new tab of the current window) with information corresponding to additional local documents.

In some embodiments, document information corresponding to a respective document in document information view 452 includes subject or title 440, focus region 442, and source 444 corresponding to the respective document. Subject or title 440 is typically specified by a user as a subject or title of the corresponding document. Alternatively, title 440 is determined in accordance with the content of the corresponding document (e.g., the first sentence of the document, the most frequently used phrase, or a predefined number of words in the beginning of the document).

In some embodiments, focus region 442 is a region in the corresponding document that includes some key words identified from the displayed document. As illustrated, the displayed document includes the terms "positive effect" and "Internet," and related document view 452 includes respective documents that include the terms "positive effect" and/or "Internet." In addition, a respective portion of the respective document that includes the terms "positive effect" and/or "Internet" is displayed as a focus region (e.g., 442-1, 442-2, and 442-3).

In some embodiments, when the respective document includes the identified key words in multiple regions, one of the multiple regions is selected as a representative focus region. In some embodiments, a region that best matches the identified key words is selected (e.g., the selected region includes the key words exactly, or the identified key words appear in the selected region with the least number of words among the identified key words). In some embodiments, a first paragraph, a title, or a last paragraph that includes the key words is selected.

In some embodiments, source 444 indicates a location of the corresponding document. In some embodiments, activating source 444 initiates displaying the document (in a new window or a new tab of the current window). In some embodiments, activating source 444 initiates displaying information that corresponds to documents in the source (e.g., documents in the same folder or directory with the corresponding document).

In some embodiments, activating a respective focus region (e.g., 442-1) initiates inserting the focus specification of the corresponding document (e.g., 442-1) in the document displayed in document view 410, in some embodiments. In some embodiments, activating a respective source (e.g., 444-1) initiates inserting the focus specification of the corresponding document (e.g., 442-1) in the document displayed in document view 410. Optionally, activating a subject (e.g., 440-1) also initiates inserting the focus specification (e.g., 442-1) of the corresponding document in the document displayed in the document view 410.

Figure 4E:
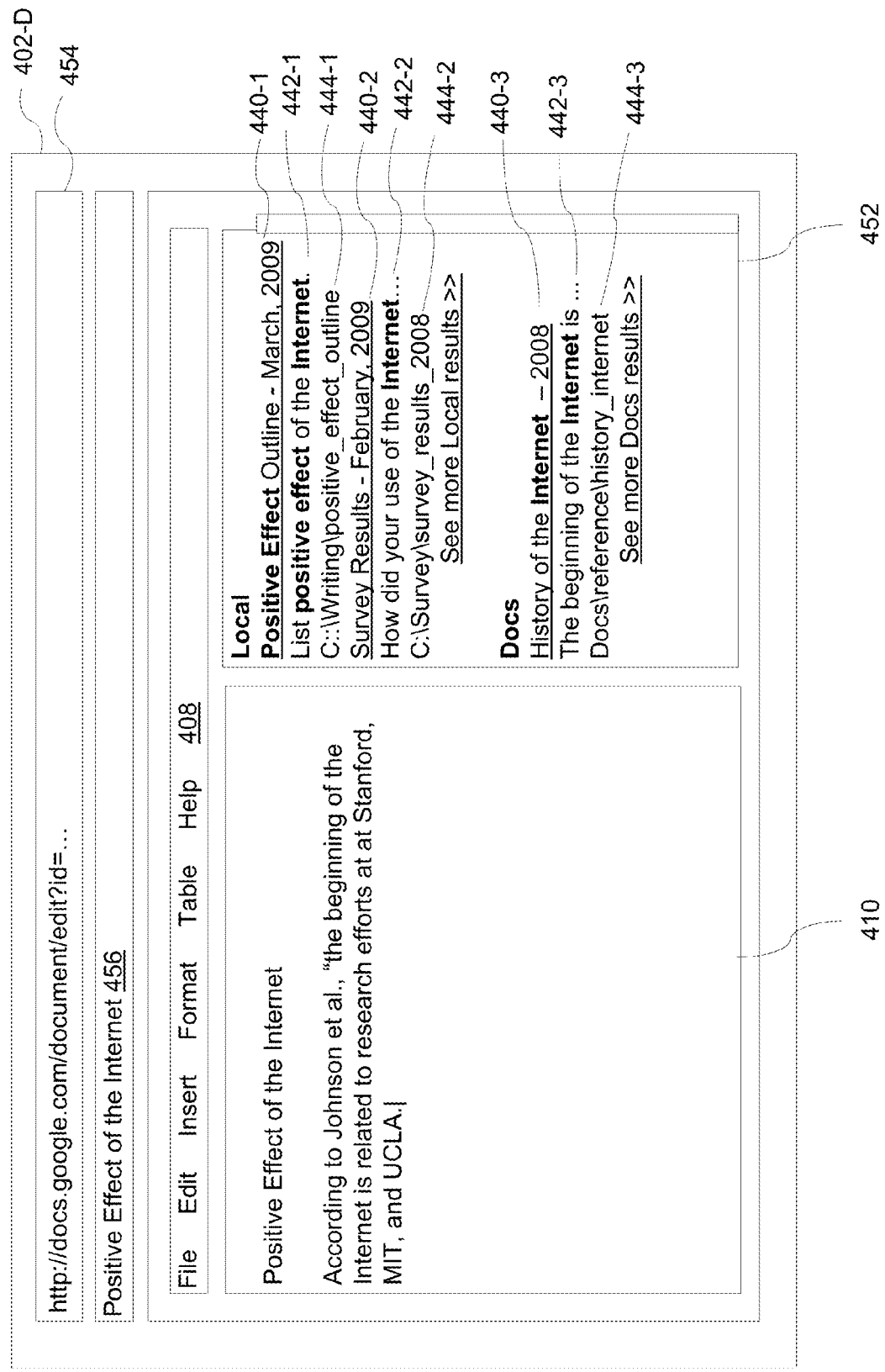
Figure 5A:
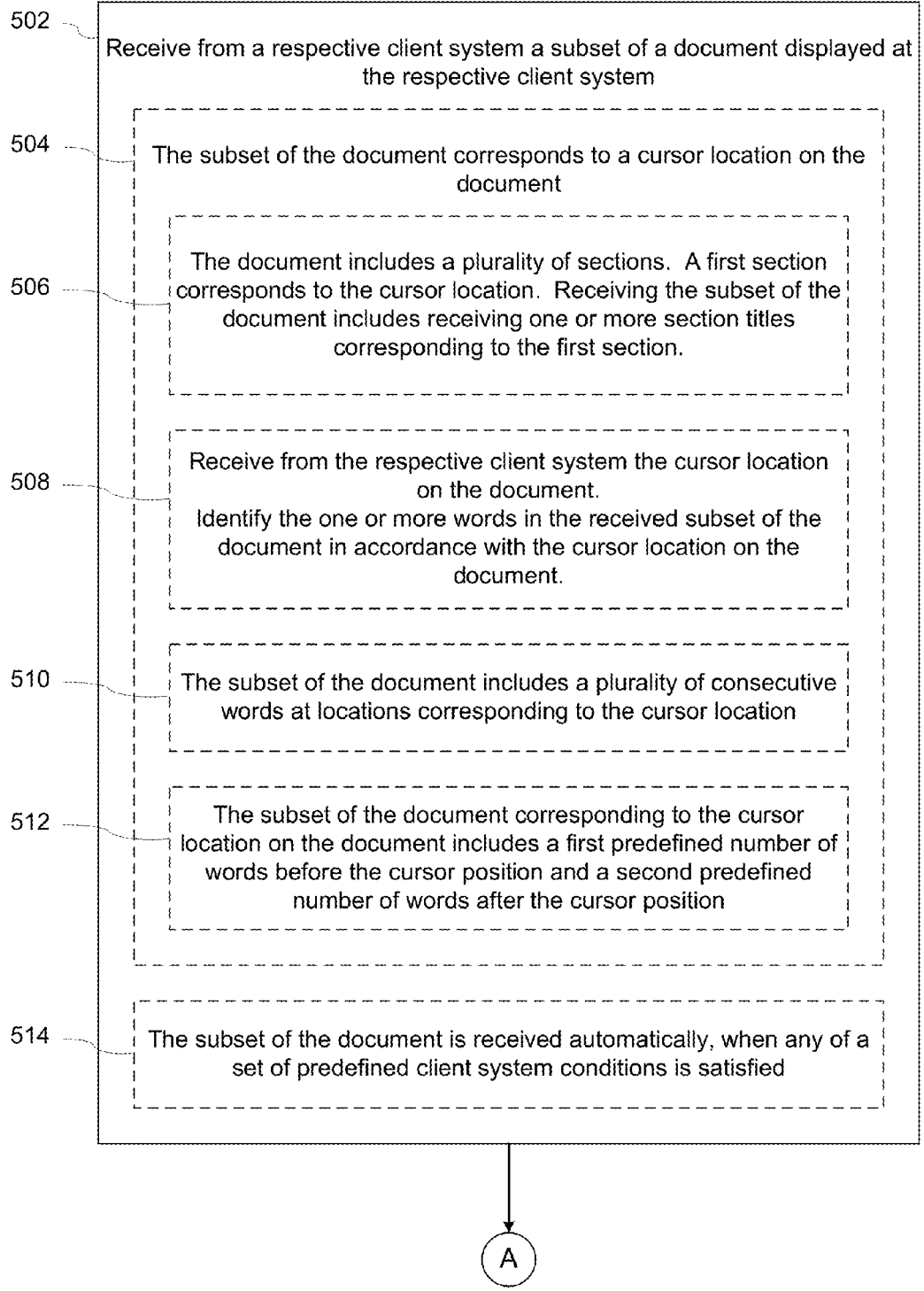
FIGS. 5A-5E are flowcharts representing a method performed at a server system for inserting a citation to a document, in accordance with some embodiments.
Figure 5B:
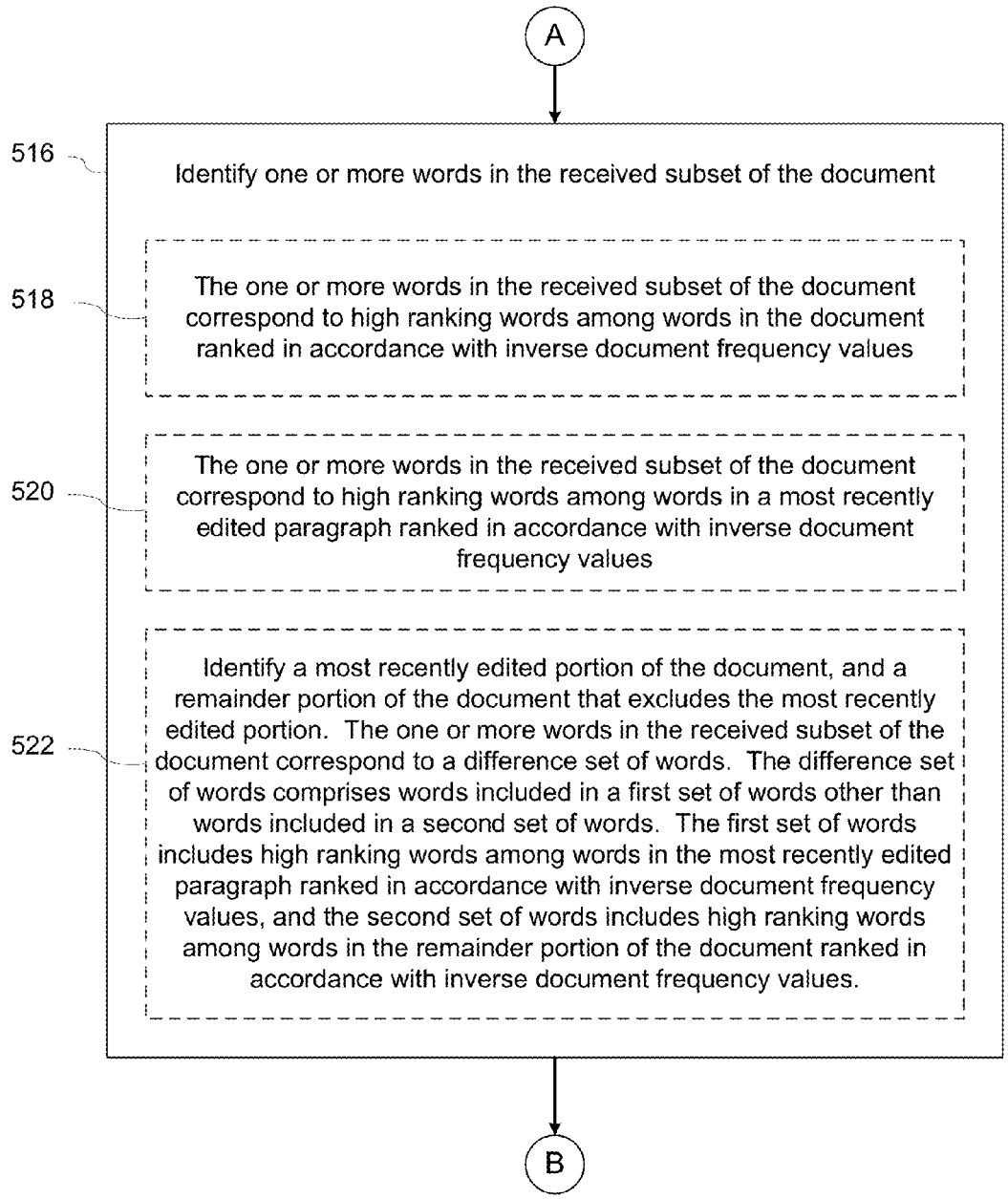
Figure 5C:
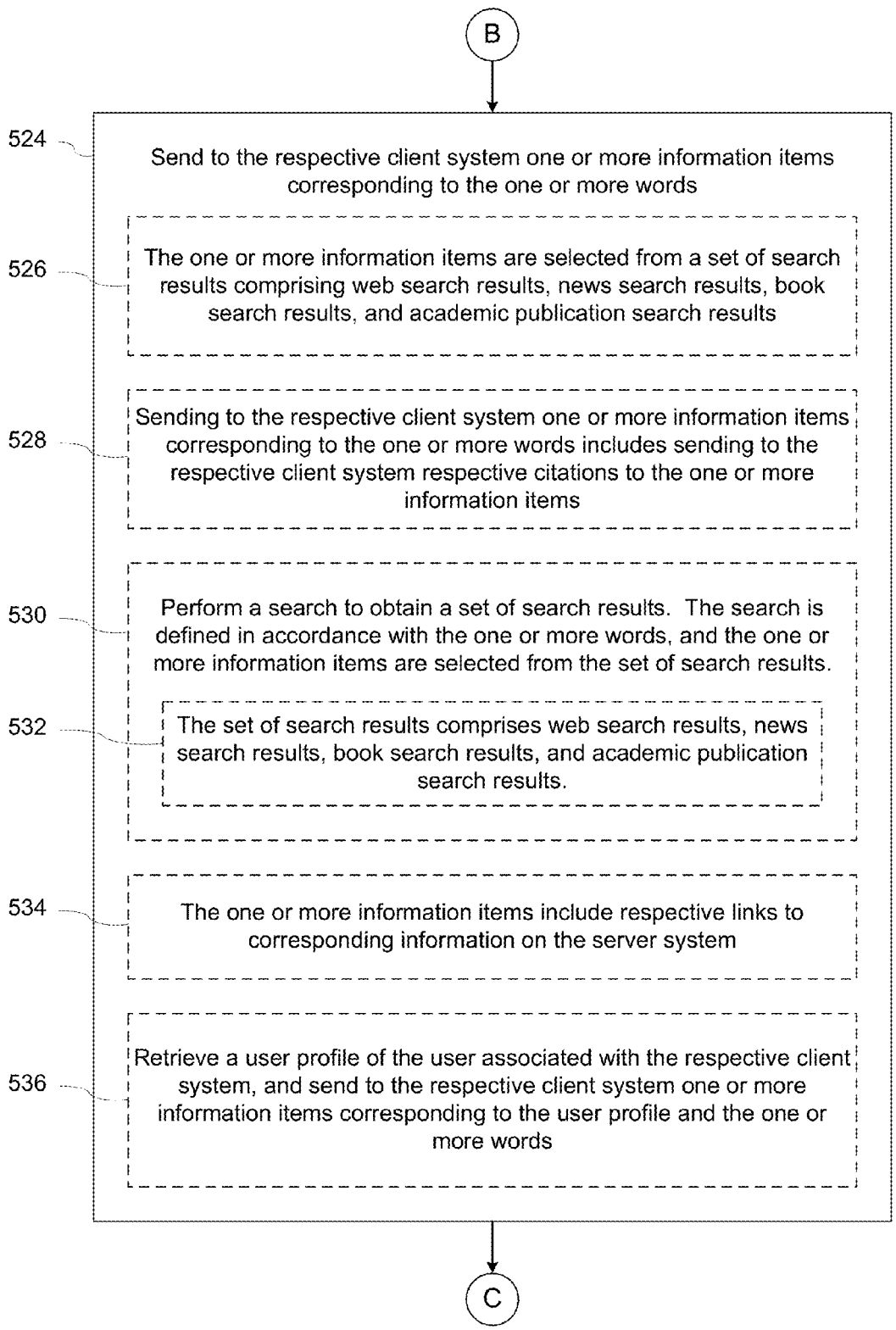
Figure 5D:
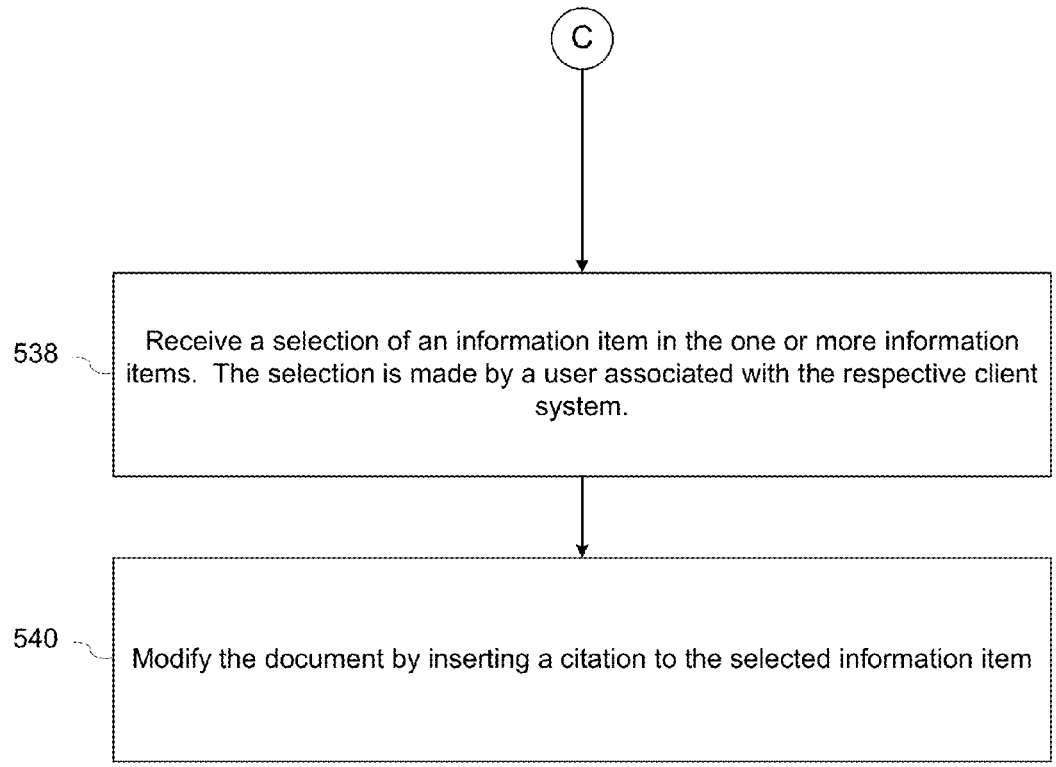
Figure 5E:
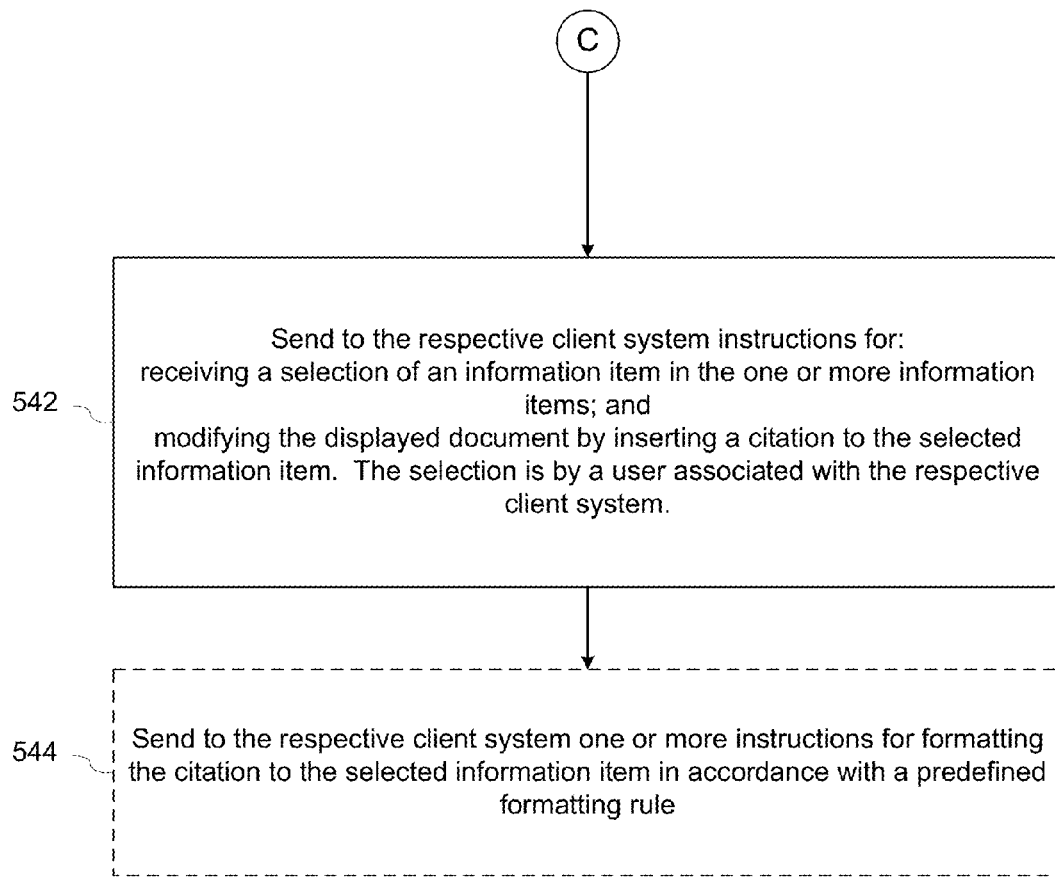

FIG. 4E illustrates an example of user interface 402-E after selection of a document information corresponding to a respective document (e.g., by activating the title, focus region, or source of the respective document). In response to the selection of the respective document, a focus region corresponding to the respective document is inserted into the document displayed in document view 410.

FIGS. 5A-5E are flowcharts representing a method performed at a server system for inserting a citation to a document, in accordance with some embodiments. The method is performed at a server system having one or more processors and memory storing one or more programs executed by the one or more processors (e.g., document system 108, FIG. 1).

The server system receives (502) from a respective client system a subset of a document displayed at the respective client system (e.g., a portion of a document displayed in document view 410 in FIG. 4B). In some embodiments, the subset includes an entire document. In some embodiments, the subset includes all words in the document. In some embodiments, the subset includes a predefined number of most recent words (or most recently typed or edited words) in the document. In some embodiments, the subset includes a most recent sentence (or a most recently typed or edited sentence) in the document. In some embodiments, the subset includes a predefined number of most recent sentences (or most recently typed or edited sentences) in the document. In some embodiments, the subset includes a most recent paragraph (or a most recently typed or edited paragraph) in the document. In some embodiments, the subset includes a predefined number of most recent paragraphs (or most recently typed or edited paragraphs) in the document.

In some embodiments, the server system receives from the respective client system the subset of the document that corresponds to the cursor location on the document displayed on the respective client system.

In some embodiments, the subset of the document corresponds (504) to a cursor location on the document.

In some embodiments, the document includes (506) a plurality of sections, and a first section of the plurality of sections corresponds to the cursor location. Receiving the subset of the document includes receiving one or more section titles corresponding to the first section (e.g., in FIG. 4A, the term "Background" is a section title for the paragraph starting with "Healthcare is an important topic . . . "). In some embodiments, a respective section title is explicitly designated as a section title (e.g., based on a property (or style) of a term, phrase, or sentence).

In some embodiments, the server system receives (508) from the respective client system the cursor location on the document, and identifies the one or more words in the received subset of the document in accordance with the cursor location on the document. For example, the server system receives from the respective client system a character count that represents the cursor location on the document (e.g., the cursor is located after an N-number of characters from the beginning of the document). The server system determines the cursor location in accordance with the character count, and identifies one or more words adjacent to the cursor location. Alternatively, the server system may receive a word count, a sentence count, or a paragraph count from the respective client system.

In some embodiments, the subset of the document includes (510) a plurality of consecutive words at locations corresponding to the cursor location. In some embodiments, the consecutive words include a word positioned at a location that corresponds to the cursor location (e.g., the cursor is co-located with the included word).

In some embodiments, the subset of the document corresponding to the cursor location on the document includes (512) a first predefined number of words before the cursor position and a second predefined number of words after the cursor position. In some embodiments, the first predefined number and the second predefined number are identical. In some embodiments, the first predefined number and the second predefined number are distinct. In some embodiments, the first predefined number is zero and the second predefined number is non-zero. In some embodiments, the first predefined number is non-zero and the second predefined number is zero. In some embodiments, the first and second predefined numbers are defined by first and second rules. For example, the first predefined number is the number of words in a predefined portion of the document (e.g., a sentence, paragraph, section, document) positioned before the cursor, but not exceeding a first threshold (e.g., the first word of the document), and the second predefined number is the number of words in the same predefined portion of the document positioned after the cursor position, but not exceeding a second threshold (e.g., the last word of the document).

In some embodiments, the subset of the document is received (514) automatically, when any of a set of predefined client system conditions is satisfied. For example, the predefined client system conditions for sending a subset of the document to the server include: a change in cursor position to a new section (paragraph, etc.) of the document, entry of at least a threshold amount of new text or revised text (e.g., at least one new word, or revision of at least one word), and a change in text formatting (e.g., highlighting text, underlining text). The subset of the document is typically received without a user request to send the subset of the document from the respective client system.

The server system identifies (516, FIG. 5B) one or more words in the received subset of the document (e.g., "Healthcare Debate" in FIG. 4A). In some embodiments, the one or more words include all words in the received subset of the document. In some embodiments, the one or more words include a predefined number of most recent words in the received subset of the document. In some embodiments, the one or more words include a most recent sentence in the received subset of the document. In some embodiments, the one or more words include a predefined number of most recent sentences in the received subset of the document. In some embodiments, the one or more words include a most recent paragraph in the received subset of the document.

In some embodiments, the one or more words in the received subset of the document correspond (518) to high ranking words among words in the document ranked in accordance with inverse document frequency values. In some embodiments, the one or more words in the received subset of the document correspond to a predefined number of high ranking words among the ranked words.

In some embodiments, the one or more words in the received subset of the document correspond (520) to high ranking words among words in a most recently edited paragraph ranked in accordance with inverse document frequency values. In some embodiments, the one or more words in the received subset of the document correspond to high ranking words among words in a predefined number of most recently edited paragraphs.

In some embodiments, the server system identifies (522) a most recently edited portion of the document, and a remainder portion of the document that excludes the most recently edited portion. The one or more words in the received subset of the document correspond to a difference set of words. The difference set of words comprises words included in a first set of words other than words included in a second set of words. The first set of words includes high ranking words among words in the most recently edited paragraph ranked in accordance with inverse document frequency values, and the second set of words includes high ranking words among words in the remainder portion of the document ranked in accordance with inverse document frequency values. Accordingly, in some embodiments, the first set of words is called a paragraph set of words, and the second set of words is called a remainder set of words. In one example, the first set includes "Clinton," and "Healthcare," and the second set includes "Healthcare" and "Obama." Then the difference set includes "Clinton," and not "Healthcare." In some embodiments, the identified one or more words in the received subset include the difference set of words.

In some embodiments, the one or more words in the received subset of the document include one or more words highlighted by a user associated with the respective client system (e.g., by changing font color or background color, underlining, italicizing, or changing to bold fonts, etc.).

Figure 9:
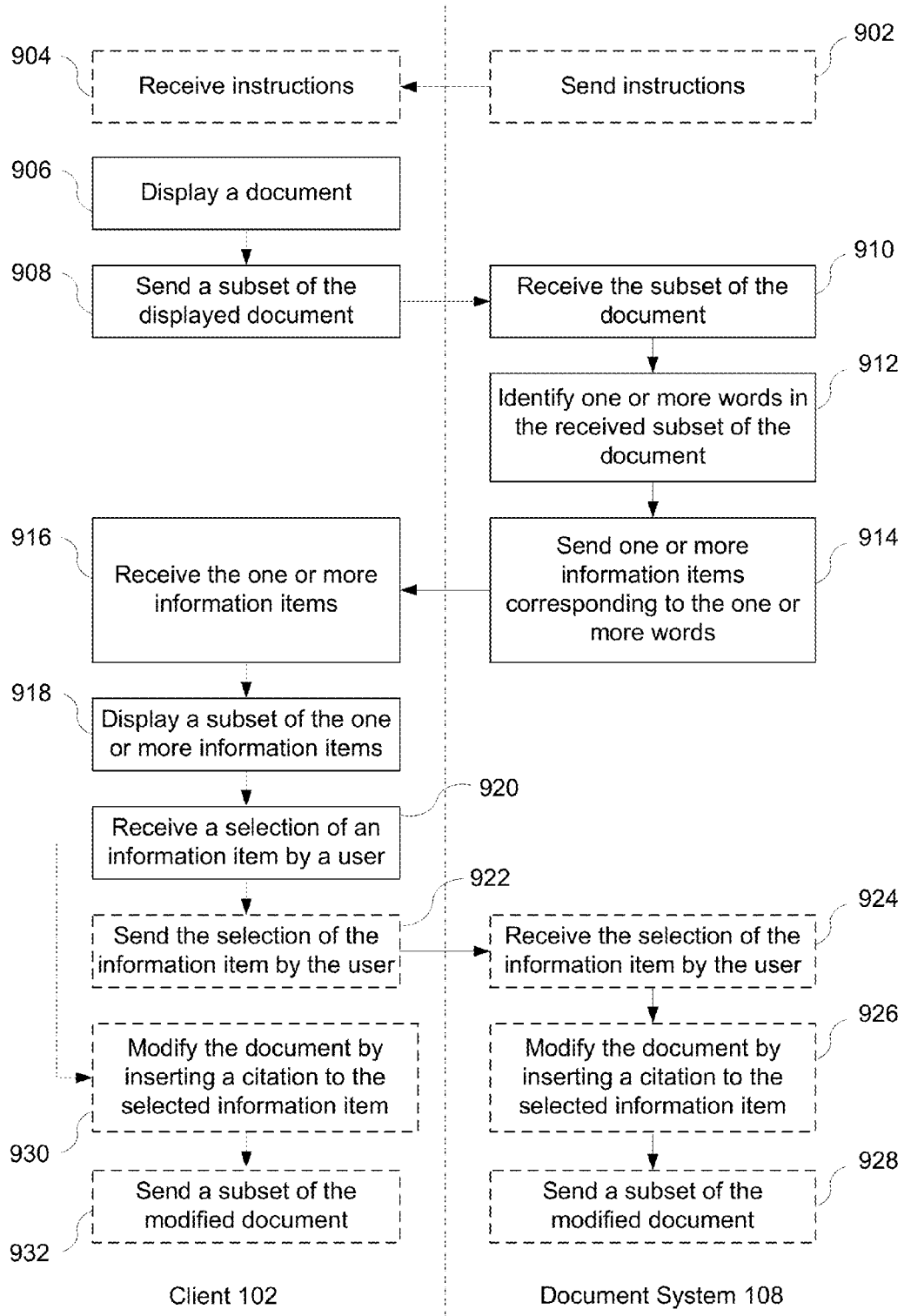
FIG. 9 is a flowchart illustrating processes performed by a client and a document system for inserting a citation to a document, in accordance with some embodiments.

The server system sends (524, FIG. 5C) to the respective client system one or more information items corresponding to the one or more words (e.g., operation 914, FIG. 9). In some embodiments, the one or more information items are web search results that are obtained using the one or more words as search key words. In some embodiments, in addition, or alternatively, the one or more information items are obtained from a news search, a book search, and/or an academic publication search.

In some embodiments, the one or more information items are selected (526) from a set of search results comprising web search results, news search results, book search results, and academic publication search results (e.g., FIGS. 4A-4B).

In some embodiments, sending to the respective client system one or more information items corresponding to the one or more words includes (528) sending to the respective client system respective citations to the one or more information items. In some embodiments, the server system simultaneously sends the information items and the citations. In some embodiments, the citations are formatted in accordance with a predefined format. For example, the predefined format may be one of: the Chicago format, the Modern Language Association (MLA) format, and the American Psychological Association (APA) format. In some embodiments, the predefined format includes a set of attributes and values so that a citation sent by the server system is configured for conversion into any other format (e.g., the Chicago format, the MLA format, the APA format, etc.).

In some embodiments, the server system performs (530) a search to obtain a set of search results. The search is defined in accordance with the one or more words (e.g., a search is performed using the one or more words as query terms), and the one or more information items are selected from the set of search results. In some embodiments, the server system internally performs a search (e.g., without using other search engines). Alternatively or additionally, the server system performs a search by using one or more search engines (e.g., search engine system 104, FIG. 1). For example, the server system sends a query to the one or more search engines using the search engine interface (220, FIG. 2), and receives one or more search results from the one or more search engines (104, FIG. 1). In some embodiments, the one or more information items sent (524) to the respective client system include at least a subset of the search results.

In some embodiments, the set of search results comprises (532) web search results, news search results, book search results, and academic publication search results. In some embodiments, the set of search results includes any subset or superset of such search results (e.g., the search results may include, additionally or alternatively, document search results). In some embodiments, the one or more search engines include a web search engine, a news search engine, a book search engine, and an academic publication search engine. In some embodiments, the one or more search engines include a subset or superset of such search engines (e.g., the search results may include, additionally or alternatively, a document search engine.

In some embodiments, the one or more information items include respective links (e.g., a universal resource locator (URL)) to corresponding information. In some embodiments, the respective client system receiving the one or more information items retrieves the corresponding information using the respective links. In some embodiments, the server system retrieves the corresponding information using the respective links (e.g., the server system retrieves the corresponding information from another online server). In some embodiments, the one or more information items include (534) respective links to corresponding information on the server system.

In some embodiments, the server system retrieves (536) a user profile of the user associated with the respective client system, and sends to the respective client system one or more information items corresponding to the user profile and the one or more words. In some embodiments, the user profile includes filtering criteria. Typically, the filtering criteria includes a list of sources (e.g., selection of search engines or types of search engines), categories of information (e.g., web page, academic publication, etc.), timing criteria (e.g., results published after a predefined year), or any subset or superset thereof. In some embodiments, the filtering criteria, additionally or alternatively, includes banned keywords (for excluding search results that include the banned keywords) and/or required keywords (for identifying exclusively search results that include the required keywords).

The server system receives (538, FIG. 5D) a selection of an information item in the one or more information items. The selection is made by a user associated with the respective client system. For example, the user selects the information item using user interface 300, such as keyboard/mouse 303 (FIG. 3).

The server system modifies (540) the document by inserting a citation to the selected information item. For example, the user interface in FIG. 4C illustrates that the document displayed in document view 410 is modified to include citation 440 that corresponds to the information item with focus region 424-4. In some embodiments, the server system sends to the respective client system at least a subset of the modified document.

In some embodiments, instead of directly modifying the document (e.g., operation 540, FIG. 5D), the server system sends to a respective client system a set of instructions for modifying the document in accordance with the selection of an information item. In such embodiments, the server system receives (502, FIG. 5A) from a respective client system a subset of a document displayed at the respective client system, identifies (516, FIG. 5B) one or more words in the received subset of the document, and sends (524, FIG. 5C) to the respective client system one or more information items corresponding to the one or more words. In addition, the server system sends (542, FIG. 5E) to the respective client system instructions for receiving a selection of an information item in the one or more information items and modifying the displayed document by inserting a citation to the selected information item. The selection is made by a user associated with the respective client system. In some embodiments, the server system sends the instructions before or without receiving the subset of the document displayed at the respective client system. In some embodiments, the server system sends a web page that includes the instructions. When the respective client system executes the instructions, the respective client system modifies the displayed document in accordance with the instructions. In some embodiments, the respective client system sends the modified document to the server system, and the server system receives and stores the modified document.

In some embodiments, the server system sends (544) to the respective client system one or more instructions for formatting the citation to the selected information item in accordance with a predefined formatting rule. In some embodiments, the respective client system formats the citation in accordance with the predefined formatting rule by executing the received instructions. Similar to the instructions described above with reference to operation 542, in some embodiments, the server system sends the instructions before or without receiving the subset of the document displayed at the respective client system. In some embodiments, the server system sends a web page that includes the instructions.

Figure 6:
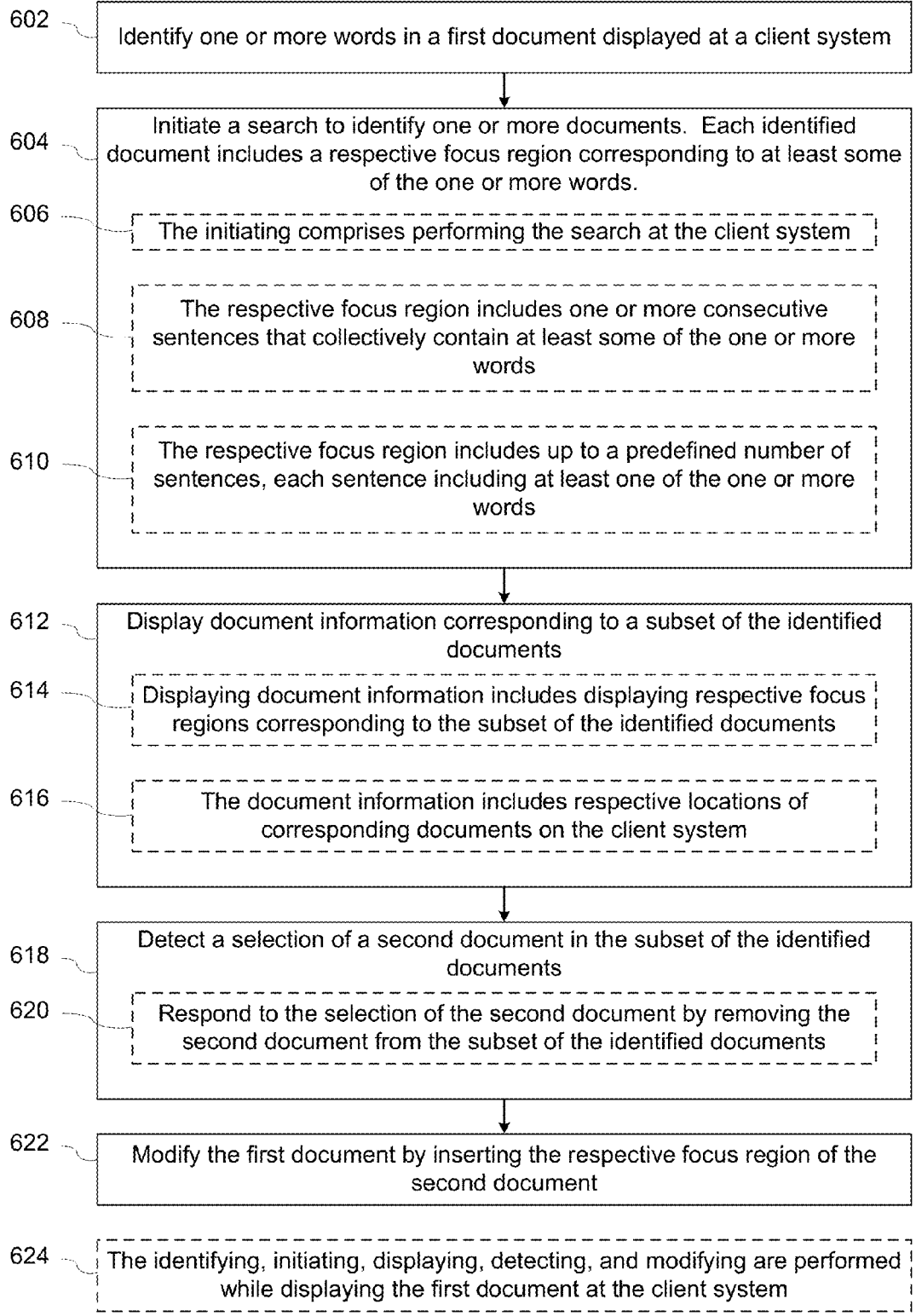
FIG. 6 is a flowchart representing a method performed at a client system for modifying a displayed document, in accordance with some embodiments.

FIG. 6 is a flowchart representing a method performed at a client system for modifying a displayed document, in accordance with some embodiments. The method is performed at a client system having one or more processors and memory storing one or more programs executed by the one or more processors (e.g., client 102, FIG. 1).

The client system identifies (602) one or more words in a first document displayed at the client system. In some embodiments, the one or more words include all words in the first document. In some embodiments, the one or more words include a predefined number of most recent words in the first document. In some embodiments, the one or more words include a most recent sentence in the first document. In some embodiments, the one or more words include a predefined number of most recent sentences in the first document. In some embodiments, the one or more words include a most recent paragraph in the first document.

The client system initiates (604) a search to identify one or more documents. Each identified document includes a respective focus region corresponding to at least some of the one or more words. In some embodiments, the respective focus region is one of: a plurality of consecutive words, a sentence, a plurality of consecutive sentences, a paragraph, a plurality of consecutive paragraphs, a title, and a heading. In some embodiments, at least one of the identified one or more documents includes a sentence that contains the one or more words. In another example, at least one of the identified one or more documents includes a paragraph that contains the one or more words. In some embodiments, the respective focus region is the entire document. In some embodiments, the respective focus region includes an image or a video associated with a caption corresponding to at least some of the one or more words. In some embodiments, the respective focus region includes an image or video in the document, for which a text paragraph preceding or subsequent to the image or video corresponds to at least some of the one or more words.

In some embodiments, the initiating comprises (606) performing the search at the client system. In some embodiments, at least one of the one or more documents is stored at the client system (e.g., 332, FIG. 3). Thus, in some embodiments, the one or more identified documents include at least one document stored at the client system.

Alternatively or additionally, the initiated search is performed by a document server or other search system that has access to documents for which the user has the right to copy content. For example, in some embodiments, the client system sends a search query to one or more search engines (e.g., search engine system 104, FIG. 1). In such embodiments, in response to initiating the search, the client system typically receives one or more search results from the one or more search engines. Alternatively, the client system sends the search query to document system 108, and document system 108 either performs the search internally, or performs the search using one or more search engines (e.g., 104, FIG. 1). In some embodiments, the one or more identified documents include at least one online document that is not stored at the client system (e.g., a web page stored at a remote web server).

In some embodiments, the respective focus region includes (608) one or more consecutive sentences that collectively contain at least some of the one or more words. In some embodiments, the one or more consecutive sentences collectively contain the one or more words.

In some embodiments, the respective focus region includes (610) up to a predefined number of sentences. Each sentence includes at least one of the one or more words. In some embodiments, the predefined number of sentences collectively contains the one or more words.

The client system displays (612) document information corresponding to a subset of the identified documents. For example, the document information includes a title, an author, and/or a date of last change or access (e.g., a title and a date in heading 440-1, FIG. 4D). In some embodiments, the client system displays one or more images and/or screenshots of one or more videos corresponding to the subset of the identified documents (e.g., one or more images and/or one or more screenshots of one or more videos included in the subset of the identified documents).

In some embodiments, displaying document information includes (614) displaying respective focus regions corresponding to the subset of the identified documents (e.g., 442-1, FIG. 4D). In some embodiments, the respective focus regions include one or more images and/or one or more screenshots of one or more videos corresponding to the subset of the identified documents.

In some embodiments, the document information includes (616) respective locations of corresponding documents. In some embodiments, the document information includes respective locations of corresponding documents on the client system. In some cases, a respective location of a corresponding document is a file path of the corresponding document (e.g., 444-1, FIG. 4D). In some embodiments, the document information includes respective locations of corresponding documents at remote servers. In some cases, a respective location of a corresponding document is a uniform resource locator of the corresponding document.

The client system detects (618) a selection of a second document in the subset of the identified documents. For example, a user selects the second document using the user interface 300, such as the keyboard/mouse 303 (FIG. 3).

In some embodiments, the client system responds (620) to the selection of the second document by removing the second document from the subset of the identified documents. For example, document information concerning the history of the Internet (e.g., 440-3, FIG. 4D) may cease to be displayed after a focus region corresponding to the second document is inserted into the displayed document. In such embodiments, information concerning one or more other identified documents is displayed in place of the removed second document.

The client system modifies (622) the first document by inserting the respective focus region of the second document. For example, in FIG. 4E, the focus region corresponding to the selected document (e.g., "the beginning of the Internet is . . . ") is inserted in the displayed document. In some embodiments, the client system inserts a respective image or a screenshot of a video of the second document into the first document. In some embodiments, the client system inserts (e.g., embeds) a video of the second document into the first document.

In some embodiments, the identifying (602), initiating (604), displaying (612), detecting (618), and modifying (622) are performed (624) while displaying the first document at the client system. In some embodiments, the client system performs a real-time search to identify corresponding documents. In some embodiments, the client system automatically performs the identifying (602), initiating (604), and displaying (612) operations, without any explicit user request for such operations. In other words, the user does not need to click on any "search" icon or a similar user interface object to initiate the identifying (602), initiating (604), and displaying (612) operations.

Figure 7:
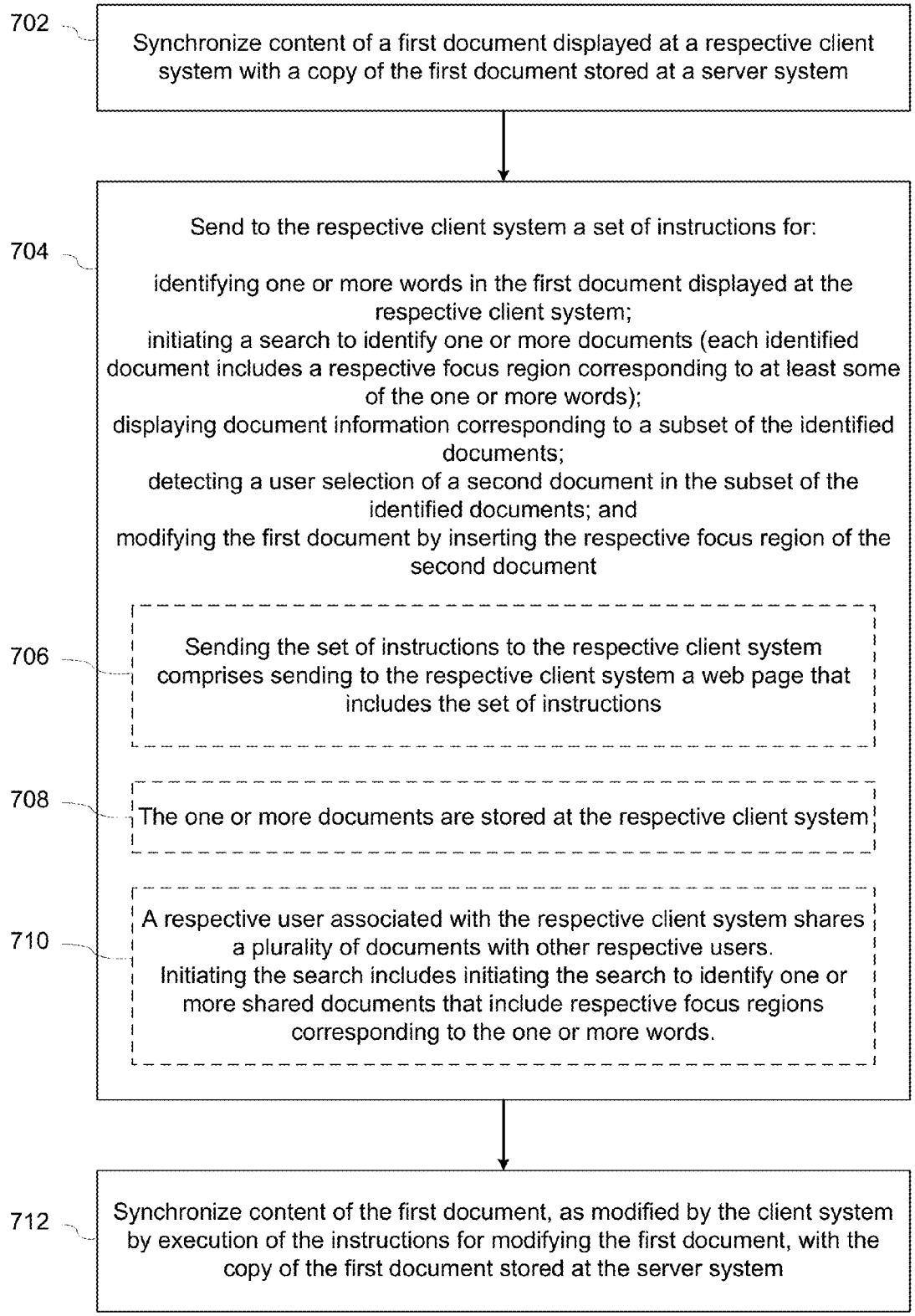
FIG. 7 is a flowchart representing a method performed at a server system for synchronizing content of a modified document, in accordance with some embodiments.

FIG. 7 is a flowchart representing a method performed at a server system for synchronizing content of a modified document, in accordance with some embodiments. The method is performed at a server system having one or more processors and memory storing one or more programs executed by the one or more processors (e.g., document system 108).

The server system synchronizes (702) content of a first document displayed at a respective client system (e.g., 102, FIG. 1) with a copy of the first document stored at the server system. In some embodiments, the server system receives content of the first document displayed at the respective client system (e.g., 102), synchronizes the received content with a copy of the first document stored at the server system, and sends the synchronized copy of the first document to the respective client system (e.g., 102).

The server system sends (704) to the respective client system (e.g., 102) a set of instructions for: identifying one or more words in the first document displayed at the respective client system, and initiating a search to identify one or more documents. Each identified document includes a respective focus region corresponding to at least some of the one or more words. The set of instructions includes instructions for displaying document information corresponding to a subset of the identified documents, detecting a user selection of a second document in the subset of the identified documents, and modifying the first document by inserting the respective focus region of the second document. In some embodiments, the respective client system, in executing the set of instructions, operates in a manner similar to operations 602, 604, 612, 618, and 622 as described above with respect to FIG. 6. In some embodiments, the set of instructions is embedded instructions (e.g., 314, FIG. 3).

In some embodiments, sending the set of instructions to the respective client system includes (706) sending to the respective client system a web page that includes the set of instructions.

In some embodiments, the one or more documents are stored (708) at the respective client system (e.g., documents 332, FIG. 3). In some embodiments, the one or more documents include at least one online document (e.g., a document that is not stored at the respective client system).

In some embodiments, a respective user associated with the respective client system shares (710) a plurality of documents with other respective users, and initiating the search includes initiating the search to identify one or more shared documents that include respective focus regions corresponding to the one or more words. For example, in FIG. 4D, the document entitled "History of the Internet" is a document that the respective user shares with other users.

In some embodiments, the corpus of documents to be searched includes both the respective user's own documents and documents of other users shared with the respective user. Thus, when a server (e.g., document system 108) performs a search to identify one or more documents, the server identifies documents owned by the respective user and shared document that the respective user has access to, and identifies the one or more documents.

The server system synchronizes (712) content of the first document, as modified by the client system by execution of the instructions for modifying the first document, with the copy of the first document stored at the server system. In some embodiments, the server system receives content of the modified document from the respective client system (e.g., 102), synchronizes the received content with a copy of the first document stored at the server system, and sends the synchronized copy of the modified document to the respective client system (e.g., 102).

Figure 8:
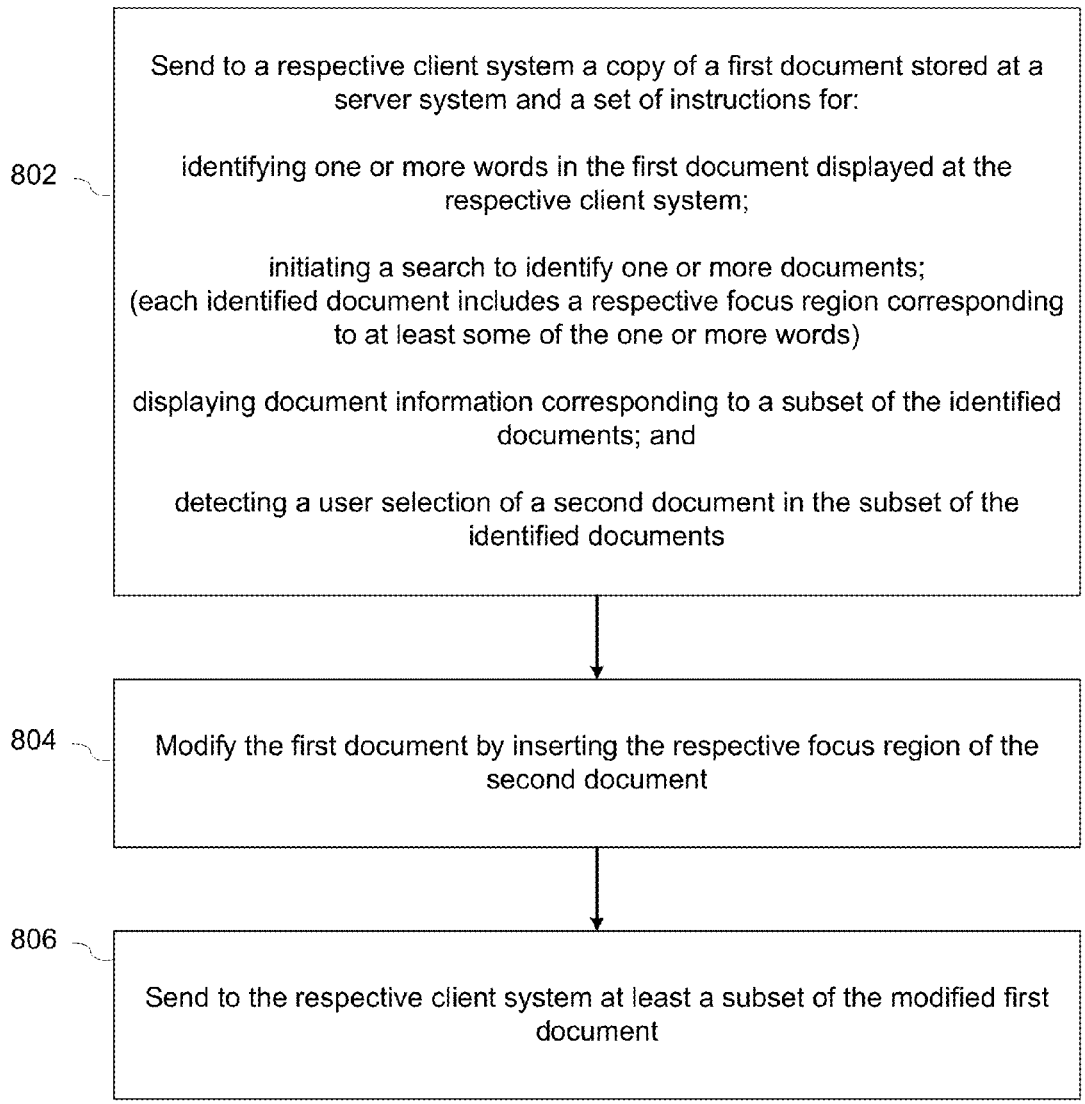
FIG. 8 is a flowchart representing a method performed at a server system for modifying a document, in accordance with some embodiments.

FIG. 8 is a flowchart representing a method performed at a server system for modifying a displayed document, in accordance with some embodiments. The method is performed at a server system having one or more processors and memory storing one or more programs executed by the one or more processors (e.g., document system 108).

The server system sends (802) to a respective client system a copy of a first document stored at the server system and a set of instructions for: identifying one or more words in the first document displayed at the respective client system, and initiating a search to identify one or more documents. Each identified document includes a respective focus region corresponding to at least some of the one or more words. The set of instructions also includes instructions for displaying document information corresponding to a subset of the identified documents, and detecting a user selection of a second document in the subset of the identified documents.

In some embodiments, the set of instructions is embedded instructions (e.g., 314, FIG. 3). In some embodiments, sending to a respective client system a copy of a first document and a set of instructions includes sending to the respective client system a web page that includes the copy of the first document and the set of instructions as embedded instructions.

In some embodiments, the set of instructions includes sending to the server system the user selection of the second document. In some embodiments, the server system receives from the respective client system the user selection of the second document. In some embodiments, the set of instructions includes instructions for sending to the server system information that corresponds to the selected second document (e.g., a document identification number or a URL corresponding to the selected second document). In some embodiments, the server system identifies the respective focus region of the second document in accordance with the information that corresponds to the selected second document. In some embodiments, the set of instructions include instructions for sending to the server system the respective focus region of the second document. In such embodiments, the server system receives from the respective client system the respective focus region of the second document.

The server system modifies (804) the first document by inserting the respective focus region of the second document. The server system sends (806) to the respective client system at least a subset of the modified first document. In some embodiments, the respective client system receives and displays the modified first document. For example, the document illustrated in FIG. 4E includes the respective focus region of the selected document.

FIG. 9 is a high-level flow diagram illustrating processes performed by a client (e.g., 102, FIG. 1) and a document system (e.g., 108, FIG. 1) for inserting a citation to a document, in accordance with some embodiments. It will be appreciated by those of ordinary skill in the art that one or more of the acts described may be performed by hardware, software, or a combination thereof, as may be embodied in one or more computing systems. In some embodiments, portions of the process performed by document system 108 can be performed by client 102. In some embodiments, portions of the process performed by client 102 can be performed by document system 108.

In some embodiments, document system 108 sends (902) instructions to client 102, and client 102 receives (904) the instructions. In some embodiments, the instructions include instructions to perform operations described below (e.g., operations 906, 908, 916, and 918).

Client 102 displays (906) a document, and sends (908) a subset of the displayed document to document system 108. Typically, client 102 also receives a user input from a user associated with client 102, modifies the document in accordance with the user input, and sends a subset of the modified document to document system 108.

In some embodiments, document system 108 sends the document to client 102 before client 102 displays the document. In other embodiments, client 102 retrieves the document locally or from a source (e.g., another document server or a remote storage server) other than document system 108.

The document system 108 receives (910) the subset of the document, identifies (912) one or more words in the received subset of the document, identifies one or more information items corresponding to the one or more words, and sends (914) at least a subset of the identified information items.

Client 102 receives (916) the one or more information items, displays (918) a subset of the one or more information items, and detects or receives (920) a selection of an information item by a user.

In some embodiments, client 102 sends (922) the selection of the information item by the user to the document system 108, and document system 108 receives (924) information representing the selection of the information item by the user. In some embodiments, document system 108 modifies (926) the document by inserting a citation to the selected information item. In some embodiments, document system 108 sends (928) to client 102 at least a subset of the modified document, or information representing the modification to the document.

Alternatively or additionally, client 102 modifies (930) the document by inserting a citation to the selected information item. In some embodiments, client 102 displays the modified document. In some embodiments, client 102 sends (932) to document system 108 at least a subset of the modified document, or information representing the modification to the document.

Figure 10:
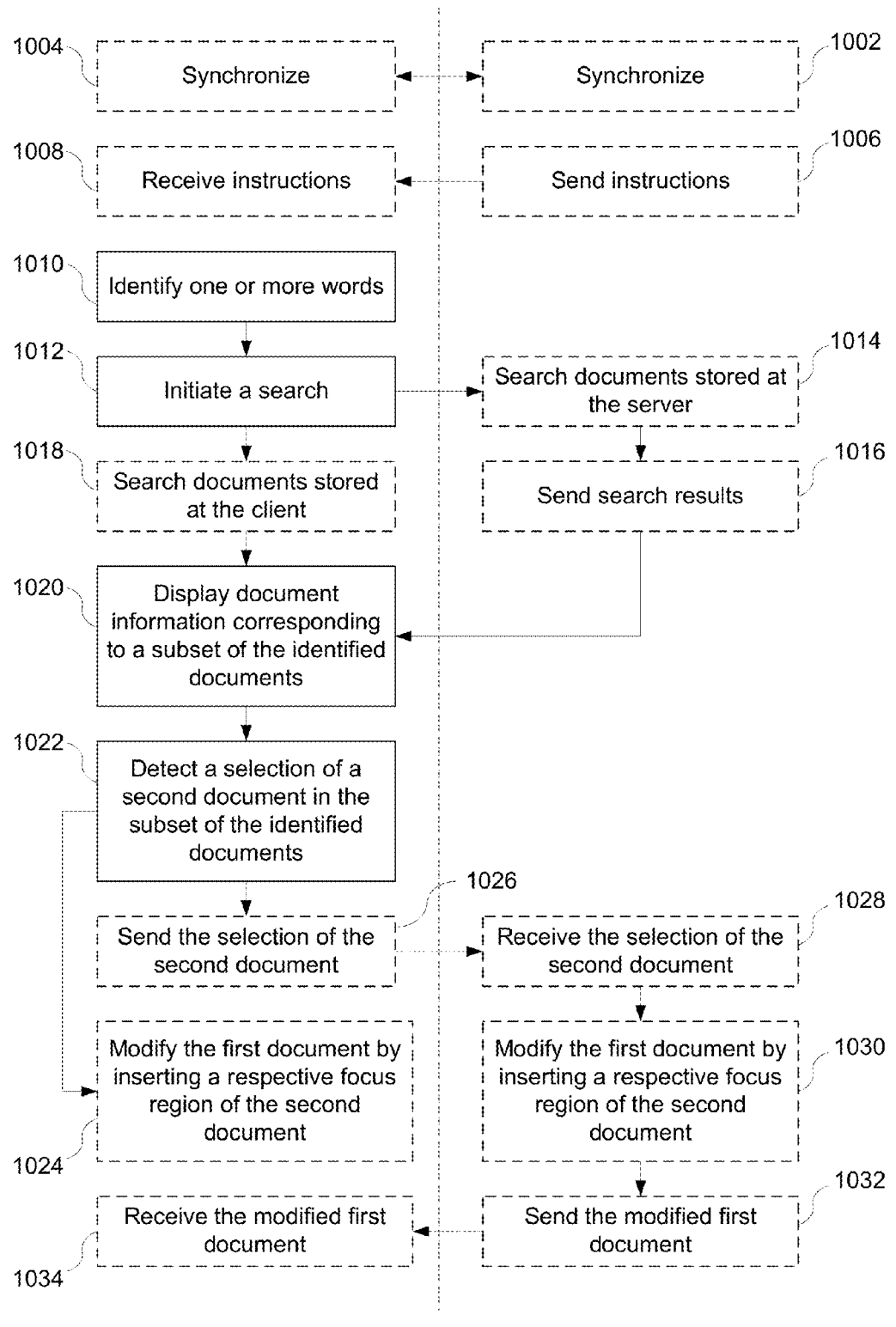
FIG. 10 is a flowchart illustrating processes performed by a client and a document system for inserting a respective focus region of a document, in accordance with some embodiments.

FIG. 10 is a high-level flow diagram illustrating processes performed by a client (e.g., client 102, FIG. 1) and a document system (e.g., document system 108, FIG. 1) for inserting a respective focus region of a document, in accordance with some embodiments. It will be appreciated by those of ordinary skill in the art that one or more of the acts described may be performed by hardware, software, or a combination thereof, as may be embodied in one or more computing systems. In some embodiments, portions of the process performed by document system 108 can be performed by client 102. In some embodiments, portions of the process performed by client 102 can be performed by document system 108.

In some embodiments, client 102 and document system 108 synchronize with each other (1002 and 1004).

In some embodiments, document system 108 sends (1006) instructions to client 102, and client 102 receives (1008) the instructions. In some embodiments, the instructions include instructions for client 102 to perform operations described below (e.g., operations 1010, 1012, 1020, and 1026).

Client 102 displays a document, identifies (1010) one or more words from the displayed document, and initiates (1012) a search for documents that correspond to the one or more words. In some embodiments, client 1012 receives a document from document system 108 before displaying the document.

In some embodiments, document system 108 searches (1014) documents stored at the server, and sends (1016) search results. In some embodiments, document system 108 searches documents stored at remote document servers (e.g., web servers). In some embodiments, client 102 searches (1018) documents stored at the client. In some embodiments, both client 102 and document system 108 perform the search.

Client 102 displays (1020) document information corresponding to a subset of the identified documents (e.g., FIG. 4D). Client 102 detects (1022) a selection of a second document in the subset of the identified documents.

In some embodiments, client 102 modifies (1024) the first document by inserting a respective focus region of the second document. In some embodiments, client 102 displays the modified first document (e.g., FIG. 4E).

In some embodiments, client 102 sends (1026) to document system 108 the selection of the second document or information representing the selection of the second document. Document system 108 receives (1028) the selection of the second document (or the information), modifies (1030) the first document by inserting a respective focus region of the second document, and sends (1032) the modified first document to client 102. Client receives (1034) the modified first document. In some embodiments, client 102 displays the modified first document (e.g., FIG. 4E).

The foregoing description, for purpose of explanation, has been described with reference to specific embodiments. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer implemented method, comprising:
at a server system having one or more processors and memory storing one or more programs executed by the one or more processors, in a document editor application executed by the server system:
receiving from a respective client system a subset of an existing document, wherein the subset is identified in accordance with a user action within the existing document and displayed at the respective client system;
in response to receiving from the respective client system the subset of the existing document:
identifying a most recently edited portion of the document, and a remainder portion of the subset of the document that excludes the most recently edited portion;
identifying one or more key words in the received subset of the document as query terms of a search query, wherein the received subset of the document includes additional terms distinct from the identified one or more key words, and wherein:
the one or more key words in the received subset of the document correspond to a difference set of words, the difference set of words comprises words included in a first set of words other than words included in a second set of words, the first set of words includes high ranking words among words in a most recently edited paragraph, in the most recently edited portion, ranked in accordance with inverse document frequency values, and the second set of words includes high ranking words among words in the remainder portion of the document ranked in accordance with inverse document frequency values;

identifying one or more information items, including initiating a search by sending the search query to a search engine system distinct from the server system, the search query having the one or more key words identified in the subset of the document as the query terms of the search query; and sending to the respective client system, for display at the respective client system, a focus region of each of the one or more identified information items, each focus region comprising a region of a respective identified information item corresponding to at least one of the one or more key words;

receiving a selection of an information item in the one or more identified information items, the selection by a user associated with the respective client system; and in response to receiving the selection of the information item, modifying the document by inserting a citation to the selected information item.

2. The method of claim 1, wherein sending to the respective client system one or more information items corresponding to the one or more key words includes sending to the respective client system respective citations to the one or more information items.

3. The method of claim 1, wherein the one or more key words in the received subset of the document correspond to high ranking words among words in the document ranked in accordance with inverse document frequency values.

4. The method of claim 1, wherein the subset of the document is received in accordance with a determination that the user action within the existing document satisfies at least one of a set of predefined client system conditions, and the set of predefined client system conditions include a change in a cursor position to a new section of the document, entry of a least a threshold amount of new text or revised text, and a change in text formatting.

5. The method of claim 1, wherein the one or more information items are selected from a set of search results comprising web search results, news search results, book search results, and academic publication search results.

6. The method of claim 1, further comprising performing a search to obtain a set of search results, wherein the search is defined in accordance with the one or more key words, and the one or more information items are selected from the set of search results.

7. The method of claim 1, wherein the one or more identified information items are grouped into a plurality of categories, and sending the focus region of each of the one or more identified information items further comprises:

sending to the respective client system, for display at the respective client system, the respective focus region of each of the one or more identified information items, which are configured to be displayed as grouped into the plurality of categories.

8. The method of claim 1, wherein the one or more information items include respective links to corresponding information on the server system.

9. The method of claim 1, further comprising:

retrieving a user profile of the user associated with the respective client system, wherein the user profile includes filtering criteria for one or more of: sources, categories of information, timing criteria, banned keywords, and required keywords, wherein initiating the search to identify the one or more information items includes identifying the one or more information items corresponding to the user profile and the one or more key words.

10. The method of claim 1, wherein the subset of the document corresponds to a cursor location on the document.

11. The method of claim 10, wherein the document includes a plurality of sections, a first section corresponds to the cursor location, and receiving the subset of the document includes receiving one or more section titles corresponding to the first section.

12. The method of claim 10, further comprising:

receiving from the respective client system the cursor location on the document; and identifying the one or more key words in the received subset of the document in accordance with the cursor location on the document.

13. The method of claim 10, wherein the subset of the document includes a plurality of consecutive words at locations corresponding to the cursor location.

14. The method of claim 10, wherein the subset of the document corresponding to the cursor location on the document includes a first predefined number of words before the cursor position and a second predefined number of words after the cursor position.

15. The method of claim 1, wherein the subset of the document is received automatically, when any of a set of predefined client system conditions is satisfied.

16. A computer implemented method, comprising:

at a server system having one or more processors and memory storing one or more programs executed by the one or more processors, in a document editor application executed by the server system:

receiving from a respective client system a subset of an existing document, wherein the subset is identified in accordance with a user action within the existing document and displayed at the respective client system;

in response to receiving from the respective client system the subset of the existing document:

identifying a most recently edited portion of the document, and a remainder portion of the subset of the document that excludes the most recently edited portion;

identifying one or more key words in the received subset of the document as query terms of a search query, wherein the received subset of the document includes additional terms distinct from the identified one or more key words, and wherein:

the one or more key words in the received subset of the document correspond to a difference set of words, the difference set of words comprises words included in a first set of words other than words included in a second set of words, the first set of words includes high ranking words among words in a most recently edited paragraph, in the most recently edited portion, ranked in accordance with inverse document frequency values, and the second set of words includes high ranking words among words in the remainder portion of the document ranked in accordance with inverse document frequency values;

identifying one or more information items, including initiating a search by sending the search query to a search engine system distinct from the server system, the search query having the one or more key words identified in the subset of the document as the query terms of the search query; and sending to the respective client system, for display at the respective client system, a focus region of each of the one or more identified information items, each focus region comprising a region of a respective identified information item corresponding to at least one of the one or more key words; and sending to the respective client system instructions for:

receiving a selection of an information item in the one or more information items, the selection by a user associated with the respective client system; and in response to receiving the selection of the information item, modifying the displayed document by inserting a citation to the selected information item.

17. The method of claim 16, further comprising sending to the respective client system one or more instructions for formatting the citation to the selected information item in accordance with a predefined formatting rule.

18. The method of claim 16, wherein the subset of the document is received in accordance with a determination that the user action within the existing document satisfies at least one of a set of predefined client system conditions, and the set of predefined client system conditions include a change in a cursor position to a new section of the document, entry of a least a threshold amount of new text or revised text, and a change in text formatting.

19. A system comprising:

one or more processors; and memory storing one or more programs for execution by the one or more processors, the one or more programs including:

instructions for receiving from a respective client system a subset of an existing document, wherein the subset is identified in accordance with a user action within the existing document and displayed at the respective client system;

instructions for in response to receiving from the respective client system the subset of the existing document:

identifying a most recently edited portion of the document, and a remainder portion of the subset of the document that excludes the most recently edited portion;

identifying one or more key words in the received subset of the document as query terms of a search query, wherein the received subset of the document includes additional terms distinct from the identified one or more key words, and wherein:

the one or more key words in the received subset of the document correspond to a difference set of words, the difference set of words comprises words included in a first set of words other than words included in a second set of words, the first set of words includes high ranking words among words in a most recently edited paragraph, in the most recently edited portion, ranked in accordance with inverse document frequency values, and the second set of words includes high ranking words among words in the remainder portion of the document ranked in accordance with inverse document frequency values;

identifying one or more information items, including initiating a search by sending the search query to a search engine system distinct from the server system, the search query having the one or more key words identified in the subset of the document as the query terms of the search query; and sending to the respective client system, for display at the respective client system, a focus region of each of the one or more identified information items, each focus region comprising a region of a respective identified information item corresponding to at least one of the one or more key words; and instructions for sending to the respective client system instructions for:

receiving a selection of an information item in the one or more information items, the selection by a user associated with the respective client system; and in response to receiving the selection of the information item, modifying the displayed document by inserting a citation to the selected information item.

20. A non-transitory computer readable storage medium storing one or more programs for execution by one or more processors in a computer system, the one or more programs including:

instructions for receiving from a respective client system a subset of an existing document, wherein the subset is identified in accordance with a user action within the existing document and displayed at the respective client system;

instructions for in response to receiving from the respective client system the subset of the existing document:

identifying a most recently edited portion of the document, and a remainder portion of the subset of the document that excludes the most recently edited portion;

identifying one or more key words in the received subset of the document as query terms of a search query, wherein the received subset of the document includes additional terms distinct from the identified one or more key words, and wherein:

the one or more key words in the received subset of the document correspond to a difference set of words, the difference set of words comprises words included in a first set of words other than words included in a second set of words, the first set of words includes high ranking words among words in a most recently edited paragraph, in the most recently edited portion, ranked in accordance with inverse document frequency values, and the second set of words includes high ranking words among words in the remainder portion of the document ranked in accordance with inverse document frequency values;

identifying one or more information items, including initiating a search by sending the search query to a search engine system distinct from the server system, the search query having the one or more key words identified in the subset of the document as the query terms of the search query; and sending to the respective client system, for display at the respective client system, a focus region of each of the one or more identified information items, each focus region comprising a region of a respective identified information item corresponding to at least one of the one or more key words; and instructions for sending to the respective client system instructions for:

receiving a selection of an information item in the one or more information items, the selection by a user associated with the respective client system; and in response to receiving the selection of the information item, modifying the displayed document by inserting a citation to the selected information item.

* * * * *

UNITED STATES PATENT AND TRADEMARK OFFICE
CERTIFICATE OF CORRECTION

PATENT NO. : 9,934,224 B2
APPLICATION NO. : 13/776599
DATED : April 3, 2018
INVENTOR(S) : Ho It is certified that error appears in the above-identified patent and that said Letters Patent is hereby corrected as shown below:

In the Claims

Claim 1, Column 22, Line 66, please delete "a difference set" and insert --a different set--;

Claim 1, Column 23, Line 1, please delete "the difference set" and insert --the different set--;

Claim 14, Column 24, Line 33, please delete "cursor position and" and insert --cursor location and--;

Claim 14, Column 24, Line 34, please delete "cursor position." and insert --cursor location.--;

Claim 16, Column 24, Line 60, please delete "a difference set" and insert --a different set--;

Claim 16, Column 24, Line 62, please delete "the difference set" and insert --the different set--;

Claim 19, Column 25, Line 41, please delete "A system comprising:" and insert --A server system comprising:--;

Claim 19, Column 25, Line 63, please delete "a difference set" and insert --a different set--;

Claim 19, Column 25, Line 65, please delete "the difference set" and insert --a different set--;

Claim 20, Column 26, Line 51, please delete "a difference set" and insert --a different set--;

Claim 20, Column 26, Line 53, please delete "the difference set" and insert --the different set--;

Claim 20, Column 26, Line 67, please delete "the server system" and insert --the computer system--.

Signed and Sealed this
Twelfth Day of June, 2018

Andrei Iancu
*Director of the United States Patent and Trademark Office*